US012750798B2

(12) United States Patent
Jiao et al.

(10) Patent No.: US 12,750,798 B2
(45) Date of Patent: Sep. 29, 2026

(54) SYNCHRONIZATION METHOD IN UNLICENSED SPECTRUM AND APPARATUS

(71) Applicant: Huawei Technologies Co., Ltd., Shenzhen (CN)

(72) Inventors: Chunxu Jiao, Shanghai (CN); Jiayin Zhang, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 18/477,129

(22) Filed: Sep. 28, 2023

(65) Prior Publication Data

US 2024/0023043 A1 Jan. 18, 2024

Related U.S. Application Data

(63) Continuation of application No. PCT/CN2022/083156, filed on Mar. 25, 2022.

(30) Foreign Application Priority Data

Apr. 2, 2021 (CN) ......................... 202110362583.2

(51) Int. Cl.
*H04W 56/00* (2009.01)
*H04L 5/00* (2006.01)

(52) U.S. Cl.
CPC ....... *H04W 56/0015* (2013.01); *H04L 5/0048* (2013.01)

(58) Field of Classification Search
CPC ..... H04L 5/001; H04L 5/0016; H04L 5/0033; H04L 5/0039; H04L 5/0048; H04W 56/001; H04W 56/0015
See application file for complete search history.

(56) References Cited

U.S. PATENT DOCUMENTS

| | | | | |
|---|---|---|---|---|
| 2018/0368090 | A1 | 12/2018 | Kadambar et al. | |
| 2021/0258905 | A1* | 8/2021 | Sarkis | H04W 56/0015 |
| 2023/0127485 | A1* | 4/2023 | Sun | H04L 5/0053 370/329 |
| 2023/0354311 | A1* | 11/2023 | Xue | H04L 5/0044 |
| 2024/0113837 | A1* | 4/2024 | Hosseini | H04L 5/0053 |

OTHER PUBLICATIONS

IEEE Std 802.11™-2016, "Part 11: Wireless LAN Medium Access Control (MAC) and Physical Layer (PHY) Specifications" I, EEE Standard for Information technology—Telecommunications and information exchange between systems Local and metropolitan area networks—Specific requirements, Dec. 7, 2016, total 3534 pages.

* cited by examiner

*Primary Examiner* — Pao Sinkantarakorn
(74) *Attorney, Agent, or Firm* — Slater Matsil, LLP

(57) ABSTRACT

In accordance with an embodiment, a method includes: determining, by a first terminal device, a first communication resource in an unlicensed spectrum, wherein the first communication resource is used to send a sidelink synchronization signal block (S-SSB), and the S-SSB is used for synchronization between a second terminal device and the first terminal device; and sending, by the first terminal device, the S-SSB to the second terminal device on the first communication resource.

20 Claims, 7 Drawing Sheets

SYNCHRONIZATION METHOD IN UNLICENSED SPECTRUM AND APPARATUS

CROSS-REFERENCE TO RELATED APPLICATIONS

This application is a continuation of International Application No. PCT/CN2022/083156, filed on Mar. 25, 2022, which claims priority to Chinese Patent Application No. 202110362583.2, filed on Apr. 2, 2021. The disclosures of the aforementioned applications are hereby incorporated by reference in their entireties.

TECHNICAL FIELD

This application relates to the communication field, and more specifically, to a synchronization method in an unlicensed spectrum and an apparatus.

BACKGROUND

In a 4G long term evolution (LTE) system, cellular mobile communication starts research on an unlicensed spectrum, and a 3GPP organization performs standardization and subsequent evolution on licensed-assisted access (LAA), to enable a terminal device on the unlicensed spectrum to communicate with a base station in an LTE system through a Uu interface. In a next-generation new radio (NR) system, an NR protocol technology in an unlicensed spectrum is referred to as NR-U (NR-Unlicensed).

In addition to the Uu interface, there is also a PC5 interface. The interface is used for communication between terminal devices, and a transmission link on the interface is defined as a sidelink (SL). NR SL is an important support technology for 5th generation (5G) vehicle-to-everything (V2X) communication and device-to-device (D2D) communication. An important evolution direction of the NR SL is to enable unlicensed spectrum SL communication in local space. This part of protocol technologies may be referred to as SL-U (SL-Unlicensed).

A terminal device in an SL-U system needs to share an unlicensed spectrum with a network device that also uses the unlicensed spectrum. Compared with an NR SL system in which resources are uniformly configured by a network device, in the SL-U system, spectrum resources are more uncontrollable. Therefore, how the terminal device in the SL-U system determines a synchronization resource to perform synchronization becomes an urgent problem to be resolved.

SUMMARY

This application provides a synchronization method in an unlicensed spectrum and an apparatus, to improve flexibility of sending a sidelink synchronization signal block (S-SSB) by a terminal device, and improve synchronization performance of an SL-U system.

According to a first aspect, a synchronization method in an unlicensed spectrum is provided. The synchronization method includes: A first terminal device determines a first communication resource in the unlicensed spectrum, where the first communication resource is used to send a sidelink synchronization signal block S-SSB, and the S-SSB is used for synchronization between a second terminal device and the first terminal device; and the first terminal device sends the S-SSB to the second terminal device on the first communication resource.

The first terminal device determines, in the unlicensed spectrum, the first communication resource used to send the S-SSB, and sends the S-SSB to the second terminal device on the first communication resource, to keep synchronization between the second terminal device and the first terminal device. According to this technical solution, flexibility of sending an S-SSB by a terminal device can be enhanced, and synchronization performance of an SL-U system can be improved in this application.

With reference to the first aspect, in some implementations of the first aspect, a frequency domain resource of the first communication resource is a first resource group in a first bandwidth part BWP, the first resource group includes L resource blocks RBs, the L RBs are a part of K consecutive RBs included in the first BWP, L≤K, both L and K are positive integers, and the first BWP may be configured or preconfigured by a network device.

The first terminal device determines the first resource group in the first BWP configured or preconfigured by the network, and sends the S-SSB to the second terminal device on the first resource group, to keep synchronization between the second terminal device and the first terminal device.

With reference to the first aspect, in some implementations of the first aspect, when the L RBs included in the first resource group are consecutive, and a time domain resource of the first communication resource is a first time domain resource, the method further includes: The first terminal device sends first information to a third terminal device on the first time domain resource and a second resource group. The first information includes sidelink control information and/or sidelink data information, and the second resource group belongs to an RB other than the first resource group in the K consecutive RBs included in the first BWP.

The first terminal device simultaneously sends the S-SSB and the first information in a frequency division multiplexing FDM manner on the time domain resource used to send the S-SSB. This can avoid a case in which a resource other than a resource in the first resource group in the K RBs in the first BWP is preempted by another device such as a Wi-Fi device by using an LBT mechanism because the resource is idle, and consequently, the resource is repeatedly occupied, and S-SSB sending is interfered. Synchronization performance of the system is improved.

It should be understood that RBs in an interlaced resource block are discrete on the frequency domain resource, and an index value difference between two adjacent RBs is 5 or 10, that is, 4 or 9 RBs are spaced between two logically adjacent RBs. The information is mapped to the interlaced resource block in a decentralized manner, so that more than 80% of a bandwidth B of the allocated unlicensed spectrum can be effectively occupied. A typical value of B is 20 MHz, 40 MHz, 80 MHz, or the like.

With reference to the first aspect, in some implementations of the first aspect, a first interlaced resource block group includes the second resource group, the first interlaced resource block group includes at least one interlaced resource block, an index value difference between adjacent RBs in one interlaced resource block is equal to M, a value of M is 5 or 10, and the first interlaced resource block group is used as a part of the first BWP.

The RB used to send the first information is mapped to an interlaced resource block other than the first resource group used to send the S-SSB. In this application, the first terminal device can use the interlaced resource block more properly, and it can also be ensured that an SL-U device occupies more than 80% of the bandwidth B of the allocated unlicensed spectrum. This avoids a risk that another device such as a Wi-Fi device preempts a communication resource by using the LBT mechanism because a part of frequency domain resources are idle.

With reference to the first aspect, in some implementations of the first aspect, the first interlaced resource block group further includes a part or all of RBs in the first resource group.

According to the foregoing technical solution, the frequency domain resource can be properly occupied by properly configuring the interlaced resource block, and a resource can be properly determined for synchronization between the first terminal device and the another device. In addition, this can avoid a case in which a resource occupied by the S-SSB is preempted by another device by using the LBT mechanism because the resource occupied by the S-SSB cannot meet a resource occupation requirement in the unlicensed spectrum system.

With reference to the first aspect, in some implementations of the first aspect, the first resource group includes at least one interlaced resource block, an index value difference between adjacent RBs in the interlaced resource block is equal to M, and a value of M is 5 or 10.

The RB used to send the S-SSB is mapped to the interlaced resource block in the first resource group, and it can be ensured in this application that the SL-U device occupies more than 80% of the bandwidth B of the allocated unlicensed spectrum. This avoids a risk that another device such as a Wi-Fi device preempts a communication resource by using the LBT mechanism because a part of frequency domain resources are idle.

With reference to the first aspect, in some implementations of the first aspect, a frequency domain resource of the first communication resource is N third resource groups in a second BWP, the third resource group includes M consecutive RBs, N≥2, N indicates a quantity of S-SSBs sent by the first terminal device in the second BWP, M indicates a quantity of RBs occupied by sending one S-SSB by the first terminal device, the second BWP includes Y consecutive RBs, a product of N and M is less than or equal to Y, and N, M, and Y are all positive integers.

One S-SSB is mapped to consecutive RBs. In this way, the second terminal device can receive the S-SSB more effectively and accurately, and synchronization reliability is improved. In addition, this manner also avoids a risk that another device such as a Wi-Fi device preempts a communication resource by using the LBT mechanism because a part of frequency domain resources are idle. Communication performance of the SL-U system is improved.

With reference to the first aspect, in some implementations of the first aspect, there is a same quantity of spaced RBs between adjacent third resource groups in the N third resource groups.

The quantity X of spaced RBs between two adjacent third resource groups is specified to be the same. In this way, frequency domain positions of the N third resource groups can be configured more conveniently, and signaling overheads can be reduced.

With reference to the first aspect, in some implementations of the first aspect, when a time domain resource of the first communication resource corresponds to a first moment, the method further includes: The first terminal device sends a second S-SSB within first duration after the first moment; or when the first terminal device determines that no S-SSB is sent within first duration after the first moment, the first terminal device triggers a listen before talk mechanism, and determines a second communication resource that is in the unlicensed spectrum and that is used to send a second S-SSB.

Optionally, the first duration is a time window.

Optionally, the first duration may alternatively be a time threshold set for a counter. For example, the counter immediately starts timing each time the first terminal device sends the S-SSB. The first terminal device preferentially sends the S-SSB again to the second terminal device before the counter reaches the time threshold. If no S-SSB is sent again by the first terminal device to the second terminal device after the time threshold is reached, the LBT mechanism is triggered. In this way, even if the first terminal device fails to successfully send the S-SSB within the first duration, the first terminal device still finds an available time domain resource beyond the first duration as soon as possible, and sends the S-SSB, to maintain synchronization in the SL-U system.

In this application, the time domain resource used to send the S-SSB is determined in a dynamic manner instead of a static or semi-static manner. In this way, the first terminal device can frequently send the S-SSB, and configurability and flexibility of synchronization in the SL-U system can be improved.

With reference to the first aspect, in some implementations of the first aspect, a time domain resource of the second communication resource corresponds to a third moment, the third moment is not earlier than a second moment, and a difference between the second moment and the first moment is the first duration.

According to the foregoing technical solution, when the first terminal device fails to successfully send the S-SSB within the first duration of the S-SSB, the first terminal device still finds an available time domain resource within the first duration as soon as possible, and sends the S-SSB to the second terminal device, to maintain synchronization in the SL-U system.

With reference to the first aspect, in some implementations of the first aspect, the method further includes: The first terminal device determines a physical sidelink broadcast channel payload PSBCH payload in the S-SSB. The PSBCH payload includes at least one of the following parameters: a sending period of the S-SSB, the first duration of the S-SSB, and a first device mode, and the first device mode includes a load-based equipment mode or a frame-based equipment mode.

The first terminal device notifies another terminal device of related indication information such as a time domain mode of sending the S-SSB by the first terminal device in time domain, such as a sending period or a sending time window, to implement a function such as determining a synchronization priority. This method can be more compatible with an LBT mechanism-based channel access method in the unlicensed spectrum, and can effectively improve synchronization performance of the SL-U system.

With reference to the first aspect, in some possible implementations of the first aspect, the PSBCH payload includes M bits, the M bits indicate the sending period of the S-SSB, the sending period of the S-SSB belongs to a first set, the first set includes at least one of the following parameters: 5 ms, 10 ms, 20 ms, 40 ms, 80 ms, and 160 ms, M≥2, and M is a positive integer.

The first terminal device may indicate the sending period of the S-SSB by using the S-SSB. This helps the second terminal device receive the S-SSB, and helps the second terminal device determine the synchronization priority based on the indicated sending period of the S-SSB.

With reference to the first aspect, in some possible implementations of the first aspect, the PSBCH payload includes N bits, the N bits indicate the first duration of the S-SSB, the first duration belongs to a second set, the second set includes at least one of the following parameters: 0.5 ms, 1 ms, 2 ms, 2.5 ms, 5 ms, 10 ms, 20 ms, 40 ms, 80 ms, and 160 ms, N≥2, and N is a positive integer.

The first terminal device may indicate the first duration of the S-SSB by using the S-SSB. This helps the second terminal device receive the S-SSB, and helps the second terminal device determine the synchronization priority based on the indicated first duration of the S-SSB.

With reference to the first aspect, in some possible implementations of the first aspect, the PSBCH payload includes one bit, and the one bit indicates the first device mode of the first terminal device.

The second terminal device may determine, based on the received S-SSB, whether the SL-U system performs channel access in an LBE mode or in an FBE mode, to use a communication resource in a same channel access manner.

With reference to the first aspect, in some possible implementations of the first aspect, the PSBCH payload includes three bits, the three bits indicate a fixed frame period when the first device mode of the first terminal device is a frame-based equipment mode, and the fixed frame period belongs to a third set. The third set includes at least one of the following parameters: 1 ms, 2 ms, 2.5 ms, 4 ms, 5 ms, and 10 ms. Alternatively, the three bits indicate that the first device mode of the first terminal device is a load-based equipment mode.

When the first terminal device operates in the FBE mode, the first terminal device may indicate an FFP by using the S-SSB, and the second terminal device may determine, based on the received S-SSB, the FFP used by the SL-U system to perform channel access in the FBE mode, to use a communication resource more properly. When the first terminal device operates in the LBE mode, the first terminal device may also indicate, by using the S-SSB, that the first terminal device is in the LBE mode, and the second terminal device may determine, based on the received S-SSB, that the SL-U system performs channel access in the LBE mode, to use a communication resource more properly.

With reference to the first aspect, in some possible implementations of the first aspect, the PSBCH payload includes seven bits, the seven bits indicate a slot index of the S-SSB, and the seven bits are generated at a physical layer.

Indication information of the slot index is generated at the physical layer. In this way, the first terminal device can more flexibly generate the PSBCH payload, and can dynamically send the S-SSB, and improve synchronization performance of the SL-U system.

According to a second aspect, a synchronization method in an unlicensed spectrum is provided, and includes: A second terminal device receives, on a first communication resource in the unlicensed spectrum, a sidelink synchronization signal block S-SSB from a first terminal device, where the S-SSB is used for synchronization between the second terminal device and the first terminal device; and the second terminal device synchronizes with the first terminal device based on the S-SSB.

The second terminal device receives the S-SSB from the first terminal device, to keep synchronization with the first terminal device. According to the foregoing technical solution, in this application, synchronization between the second terminal device and the first terminal device can be enhanced, to improve synchronization performance of an SL-U system.

With reference to the second aspect, in some implementations of the second aspect, a frequency domain resource of the first communication resource is a first resource group in a first bandwidth part BWP, the first resource group includes L resource blocks RBs, and is also a part of K consecutive RBs included in the first BWP, L≤K, both L and K are positive integers, and the first BWP is configured or preconfigured by a network device.

The first terminal device determines the first resource group in the first BWP configured or preconfigured by the network, and sends the S-SSB to the second terminal device on the first resource group, to keep synchronization between the second terminal device and the first terminal device.

With reference to the second aspect, in some implementations of the second aspect, when the L RBs included in the first resource group are consecutive, and a time domain resource of the first communication resource is a first time domain resource, the second resource group belongs to an RB other than the first resource group in the K consecutive RBs included in the first BWP.

The first terminal device simultaneously sends the S-SSB and first information in a frequency division multiplexing FDM manner on the time domain resource used to send the S-SSB. This can avoid a case in which a resource other than a resource in the first resource group in the K RBs in the first BWP is preempted by another device such as a Wi-Fi device by using an LBT mechanism because the resource is idle, and consequently, the resource is repeatedly occupied, and S-SSB sending is interfered. Synchronization performance of the system is improved.

With reference to the second aspect, in some implementations of the second aspect, a first interlaced resource block group includes the second resource group, the first interlaced resource block group includes at least one interlaced resource block, an index value difference between adjacent RBs in one interlaced resource block is equal to M, a value of M is 5 or 10, and the first interlaced resource block group is used as a part of the first BWP.

The RB used to send the first information is mapped to an interlaced resource block other than the first resource group used to send the S-SSB. In this application, the first terminal device can use the interlaced resource block more properly, and it can also be ensured that an SL-U device occupies more than 80% of a bandwidth B of the allocated unlicensed spectrum. This avoids a risk that another device such as a Wi-Fi device preempts a communication resource by using the LBT mechanism because a part of frequency domain resources are idle, to ensure better synchronization between the second terminal device and the first terminal device.

With reference to the second aspect, in some implementations of the second aspect, the first interlaced resource block group further includes a part or all of RBs in the first resource group.

According to the foregoing technical solution, the frequency domain resource can be properly occupied by properly configuring the interlaced resource block, and a resource can be properly determined for synchronization between the first terminal device and the another device. In addition, this can avoid a case in which a resource occupied by the S-SSB is preempted by another device by using the LBT mechanism because the resource occupied by the S-SSB cannot meet a resource occupation requirement in the unlicensed spectrum system.

With reference to the second aspect, in some implementations of the second aspect, the first resource group includes at least one interlaced resource block, an index value difference between adjacent RBs in the interlaced resource block is equal to M, and a value of M is 5 or 10.

The RB used to send the S-SSB is mapped to the interlaced resource block in the first resource group, and it can be ensured in this application that the SL-U device occupies more than 80% of the bandwidth B of the allocated unlicensed spectrum. This avoids a risk that another device such as a Wi-Fi device preempts a communication resource by using the LBT mechanism because a part of frequency domain resources are idle.

With reference to the second aspect, in some implementations of the second aspect, a frequency domain resource of the first communication resource is N third resource groups in a second BWP, the third resource group includes M consecutive RBs, N≥2, N indicates a quantity of S-SSBs sent by the first terminal device in the second BWP, M indicates a quantity of RBs occupied by sending one S-SSB by the first terminal device, the second BWP includes Y consecutive RBs, a product of N and M is less than or equal to Y, and N, M, and Y are all positive integers.

One S-SSB is mapped to consecutive RBs. In this way, the second terminal device can receive the S-SSB more effectively and accurately, and synchronization reliability is improved. In addition, this manner also avoids a risk that another device such as a Wi-Fi device preempts a communication resource by using the LBT mechanism because a part of frequency domain resources are idle, and improves communication performance of the SL-U system.

With reference to the second aspect, in some implementations of the second aspect, there is a same quantity of spaced RBs between adjacent third resource groups in the N third resource groups.

The quantity X of spaced RBs between two adjacent third resource groups is specified to be the same. In this way, frequency domain positions of the N third resource groups can be configured more conveniently, and signaling overheads can be reduced.

With reference to the second aspect, in some implementations of the second aspect, when a time domain resource of the first communication resource corresponds to a first moment, the method further includes: The second terminal device receives a second S-SSB within first duration after the first moment; when the second terminal device receives no S-SSB within first duration after the first moment, the second terminal device receives a second S-SSB within second duration after a second moment, and a difference between the second moment and the first moment is the first duration; or when the second terminal device receives no S-SSB within first duration after the first moment and within second duration after the second moment, the second terminal device triggers a listen before talk mechanism, and determines a third communication resource that is in the unlicensed spectrum and that is used to send the third S-SSB.

Optionally, the first duration or the second duration is a time window.

Optionally, the first duration or the second duration may alternatively be a time threshold set for a counter. For example, the counter immediately starts timing each time the first terminal device sends the S-SSB. The first terminal device preferentially sends the S-SSB again to the second terminal device before the counter reaches the time threshold. If no S-SSB is sent again by the first terminal device to the second terminal device after the time threshold is reached, the LBT mechanism is triggered. In this way, even if the first terminal device fails to successfully send the S-SSB within the first duration, the first terminal device still finds an available time domain resource beyond the first duration as soon as possible, and sends the S-SSB, to maintain synchronization in the SL-U system.

When the second terminal device receives, within the first duration and the second duration, no S-SSB sent by the first terminal device, the second terminal device determines the third communication resource, and the third communication resource is used to send the S-SSB. According to this technical solution, in this application, the second terminal device can also be used as a synchronization source, and send the S-SSB to another terminal device, to maintain synchronization in the SL-U system.

With reference to the second aspect, in some implementations of the second aspect, a time domain resource of the third communication resource corresponds to a fourth moment, the fourth moment is not earlier than a third moment, and a difference between the third moment and the second moment is the second duration.

According to the foregoing technical solution, when the first terminal device fails to successfully send the S-SSB within the second duration of the S-SSB, the second terminal device can be used as a synchronization source to send the S-SSB to another terminal device, to maintain synchronization of the SL-U system.

With reference to the second aspect, in some possible implementations of the second aspect, a physical sidelink broadcast channel payload PSBCH payload in the S-SSB includes at least one of the following parameters: a sending period of the S-SSB, the first duration of the S-SSB, and a first device mode, and the first device mode includes a load-based equipment mode or a frame-based equipment mode.

In a manner in which another terminal device is notified of related indication information such as a time domain mode of sending the S-SSB in time domain, such as a sending period or a sending time window, a function such as determining a synchronization priority is implemented. This method can be more compatible with an LBT mechanism-based channel access method in the unlicensed spectrum, and can effectively improve synchronization performance of the SL-U system.

With reference to the second aspect, in some possible implementations of the second aspect, the PSBCH payload includes M bits, the M bits indicate the sending period of the S-SSB, the sending period of the S-SSB belongs to a first set, the first set includes at least one of the following parameters: 5 ms, 10 ms, 20 ms, 40 ms, 80 ms, and 160 ms, M≥2, and M is a positive integer.

Indicating the sending period of the S-SSB helps the second terminal device receive the S-SSB, and helps the second terminal device determine the synchronization priority based on the indicated sending period of the S-SSB.

With reference to the second aspect, in some possible implementations of the second aspect, the PSBCH payload includes N bits, the N bits indicate the first duration of the S-SSB, the first duration belongs to a second set, the second set includes at least one of the following parameters: 0.5 ms, 1 ms, 2 ms, 2.5 ms, 5 ms, 10 ms, 20 ms, 40 ms, 80 ms, and 160 ms, N≥2, and N is a positive integer.

Indicating the first duration of the S-SSB helps the second terminal device receive the S-SSB, and helps the second terminal device determine the synchronization priority based on the indicated first duration of the S-SSB.

With reference to the second aspect, in some possible implementations of the second aspect, the PSBCH payload includes one bit, and the one bit indicates the first device mode of the first terminal device.

The second terminal device may determine, based on the received S-SSB, whether the SL-U system performs channel access in an LBE mode or in an FBE mode, to use a communication resource in a same channel access manner.

With reference to the second aspect, in some possible implementations of the second aspect, the PSBCH payload includes three bits, the three bits indicate a fixed frame period when the first device mode of the first terminal device is a frame-based equipment mode, and the fixed frame period belongs to a third set. The third set includes at least one of the following parameters: 1 ms, 2 ms, 2.5 ms, 4 ms, 5 ms, and 10 ms. Alternatively, the three bits indicate that the first device mode of the first terminal device is a load-based equipment mode.

When the first terminal device operates in the FBE mode, the first terminal device may indicate an FFP by using the S-SSB, and the second terminal device may determine, based on the received S-SSB, the FFP used by the SL-U system to perform channel access in the FBE mode, to use a communication resource more properly. When the first terminal device operates in the LBE mode, the first terminal device may also indicate, by using the S-SSB, that the first terminal device is in the LBE mode, and the second terminal device may determine, based on the received S-SSB, that the SL-U system performs channel access in the LBE mode, to use a communication resource more properly.

With reference to the second aspect, in some possible implementations of the second aspect, the PSBCH payload includes seven bits, the seven bits indicate a slot index of the S-SSB, and the seven bits are generated at a physical layer.

Indication information of the slot index is generated at the physical layer. In this way, the second terminal device can more flexibly receive the S-SSB, and can keep synchronization with the first terminal device, to improve synchronization performance of the SL-U system.

According to a third aspect, a communication apparatus is provided, and includes a processing unit and a transceiver unit. The processing unit is configured to determine a first communication resource in an unlicensed spectrum, where the first communication resource is used to send a sidelink synchronization signal block S-SSB, and the S-SSB is used for synchronization between a second terminal device and a first terminal device; and the transceiver unit is configured to send the S-SSB to the second terminal device on the first communication resource.

With reference to the third aspect, in some possible implementations of the third aspect, a frequency domain resource of the first communication resource is a first resource group in a first bandwidth part BWP, the first resource group includes L resource blocks RBs, and is also a part of K consecutive RBs included in the first BWP, L≤K, both L and K are positive integers, and the first BWP is configured or preconfigured by a network device.

With reference to the third aspect, in some possible implementations of the third aspect, when the L RBs included in the first resource group are consecutive, and a time domain resource of the first communication resource is a first time domain resource, the transceiver unit is further configured to send first information to a third terminal device on the first time domain resource and a second resource group. The first information includes sidelink control information and/or sidelink data information; and the second resource group belongs to an RB other than the first resource group in the K consecutive RBs included in the first BWP.

With reference to the third aspect, in some possible implementations of the third aspect, a first interlaced resource block group includes the second resource group, the first interlaced resource block group includes at least one interlaced resource block, an index value difference between adjacent RBs in one interlaced resource block is equal to M, a value of M is 5 or 10, and the first interlaced resource block group is used as a part of the first BWP.

With reference to the third aspect, in some possible implementations of the third aspect, the first interlaced resource block group further includes a part or all of RBs in the first resource group.

With reference to the third aspect, in some possible implementations of the third aspect, the first resource group includes at least one interlaced resource block, an index value difference between adjacent RBs in the interlaced resource block is equal to M, and a value of M is 5 or 10.

With reference to the third aspect, in some possible implementations of the third aspect, a frequency domain resource of the first communication resource is N third resource groups in a second BWP, the third resource group includes M consecutive RBs, N≥2, N indicates a quantity of S-SSBs sent by the first terminal device in the second BWP, M indicates a quantity of RBs occupied for sending one S-SSB, the second BWP includes Y consecutive RBs, a product of N and M is less than or equal to Y, and N, M, and Y are all positive integers.

With reference to the third aspect, in some possible implementations of the third aspect, there is a same quantity of spaced RBs between adjacent third resource groups in the N third resource groups.

With reference to the third aspect, in some possible implementations of the third aspect, when a time domain resource of the first communication resource corresponds to a first moment, the transceiver unit is further configured to send a second S-SSB within first duration after the first moment; or when the processing unit is configured to determine that no S-SSB is sent within first duration after the first moment, the processing unit is configured to trigger a listen before talk mechanism, and determine a second communication resource that is in the unlicensed spectrum and that is used to send a second S-SSB.

Optionally, the first duration is a time window.

Optionally, the first duration may alternatively be a time threshold set for a counter. For example, the counter immediately starts timing each time the first terminal device sends the S-SSB. The first terminal device preferentially sends the S-SSB again to the second terminal device before the counter reaches the time threshold. If no S-SSB is sent again by the first terminal device to the second terminal device after the time threshold is reached, the LBT mechanism is triggered. In this way, even if the first terminal device fails to successfully send the S-SSB within the first duration, the first terminal device still finds an available time domain resource beyond the first duration as soon as possible, and sends the S-SSB, to maintain synchronization in the SL-U system.

With reference to the third aspect, in some possible implementations of the third aspect, a time domain resource of the second communication resource corresponds to a third moment, the third moment is not earlier than a second moment, and a difference between the second moment and the first moment is the first duration.

With reference to the third aspect, in some possible implementations of the third aspect, the processing unit is further configured to determine a physical sidelink broadcast channel payload PSBCH payload in the S-SSB. The PSBCH payload includes at least one of the following parameters: a sending period of the S-SSB, the first duration of the S-SSB, and a first device mode, and the first device mode includes a load-based equipment mode or a frame-based equipment mode.

With reference to the third aspect, in some possible implementations of the third aspect, the PSBCH payload includes M bits, the M bits indicate the sending period of the S-SSB, the sending period of the S-SSB belongs to a first set, the first set includes at least one of the following parameters: 5 ms, 10 ms, 20 ms, 40 ms, 80 ms, and 160 ms, M≥2, and M is a positive integer.

With reference to the third aspect, in some possible implementations of the third aspect, the PSBCH payload includes N bits, the N bits indicate the first duration of the S-SSB, the first duration belongs to a second set, the second set includes at least one of the following parameters: 0.5 ms, 1 ms, 2 ms, 2.5 ms, 5 ms, 10 ms, 20 ms, 40 ms, 80 ms, and 160 ms, N≥2, and N is a positive integer.

With reference to the third aspect, in some possible implementations of the third aspect, the PSBCH payload includes one bit, and the one bit indicates the first device mode of the first terminal device.

With reference to the third aspect, in some possible implementations of the third aspect, the PSBCH payload includes three bits, the three bits indicate a fixed frame period when the first device mode of the first terminal device is a frame-based equipment mode, and the fixed frame period belongs to a third set. The third set includes at least one of the following parameters: 1 ms, 2 ms, 2.5 ms, 4 ms, 5 ms, and 10 ms. Alternatively, the three bits indicate that the first device mode of the first terminal device is a load-based equipment mode.

With reference to the third aspect, in some possible implementations of the third aspect, the PSBCH payload includes seven bits, the seven bits indicate a slot index of the S-SSB, and the seven bits are generated at a physical layer.

According to a fourth aspect, a communication apparatus is provided, and includes a processing unit and a transceiver unit. The transceiver unit is configured to receive, on a first communication resource in an unlicensed spectrum, a sidelink synchronization signal block S-SSB from a first terminal device, where the S-SSB is used for synchronization between a second terminal device and the first terminal device; and the processing unit is configured to synchronize with the first terminal device based on the S-SSB.

With reference to the fourth aspect, in some implementations of the fourth aspect, a frequency domain resource of the first communication resource is a first resource group in a first bandwidth part BWP, the first resource group includes L resource blocks RBs, and is also a part of K consecutive RBs included in the first BWP, L≤K, both L and K are positive integers, and the first BWP is configured or preconfigured by a network device.

With reference to the fourth aspect, in some implementations of the fourth aspect, when the L RBs included in the first resource group are consecutive, and a time domain resource of the first communication resource is a first time domain resource, a second resource group belongs to an RB other than the first resource group in the K consecutive RBs included in the first BWP.

With reference to the fourth aspect, in some implementations of the fourth aspect, a first interlaced resource block group includes the second resource group, the first interlaced resource block group includes at least one interlaced resource block, an index value difference between adjacent RBs in one interlaced resource block is equal to M, a value of M is 5 or 10, and the first interlaced resource block group is used as a part of the first BWP.

With reference to the fourth aspect, in some implementations of the fourth aspect, the first interlaced resource block group further includes a part or all of RBs in the first resource group.

With reference to the fourth aspect, in some implementations of the fourth aspect, the first resource group includes at least one interlaced resource block, an index value difference between adjacent RBs in the interlaced resource block is equal to M, and a value of M is 5 or 10.

With reference to the fourth aspect, in some implementations of the fourth aspect, a frequency domain resource of the first communication resource is N third resource groups in a second BWP, the third resource group includes M consecutive RBs, N≥2, N indicates a quantity of S-SSBs sent by the first terminal device in the second BWP, M indicates a quantity of RBs occupied by sending one S-SSB by the first terminal device, the second BWP includes Y consecutive RBs, a product of N and M is less than or equal to Y, and N, M, and Y are all positive integers.

With reference to the fourth aspect, in some implementations of the fourth aspect, there is a same quantity of spaced RBs between adjacent third resource groups in the N third resource groups.

With reference to the fourth aspect, in some implementations of the fourth aspect, when a time domain resource of the first communication resource corresponds to a first moment, the processing unit and the transceiver unit are further configured to: receive a second S-SSB within first duration after the first moment; or when no S-SSB is received within first duration after the first moment, receive a second S-SSB within second duration after a second moment, where a difference between the second moment and the first moment is the first duration. Alternatively, when no S-SSB is received within first duration after the first moment and within second duration after the second moment, the processing unit is configured to trigger a listen before talk mechanism, and determine a third communication resource that is in the unlicensed spectrum and that is used to send a third S-SSB.

Optionally, the first duration or the second duration is a time window.

Optionally, the first duration or the second duration may alternatively be a time threshold set for a counter. For example, the counter immediately starts timing each time the first terminal device sends the S-SSB. The first terminal device preferentially sends the S-SSB again to the second terminal device before the counter reaches the time threshold. If no S-SSB is sent again by the first terminal device to the second terminal device after the time threshold is reached, the LBT mechanism is triggered. In this way, even if the first terminal device fails to successfully send the S-SSB within the first duration, the first terminal device still finds an available time domain resource beyond the first duration as soon as possible, and sends the S-SSB, to maintain synchronization in the SL-U system.

With reference to the fourth aspect, in some implementations of the fourth aspect, a time domain resource of the third communication resource corresponds to a fourth moment, the fourth moment is not earlier than a third moment, and a difference between the third moment and the second moment is the second duration.

With reference to the fourth aspect, in some possible implementations of the fourth aspect, a physical sidelink broadcast channel payload PSBCH payload in the S-SSB includes at least one of the following parameters: a sending period of the S-SSB, the first duration of the S-SSB, and a first device mode, and the first device mode includes a load-based equipment mode or a frame-based equipment mode.

With reference to the fourth aspect, in some possible implementations of the fourth aspect, the PSBCH payload includes M bits, the M bits indicate the sending period of the S-SSB, the sending period of the S-SSB belongs to a first set, the first set includes at least one of the following parameters: 5 ms, 10 ms, 20 ms, 40 ms, 80 ms, and 160 ms, M≥2, and M is a positive integer.

With reference to the fourth aspect, in some possible implementations of the fourth aspect, the PSBCH payload includes N bits, the N bits indicate the first duration of the S-SSB, the first duration belongs to a second set, the second set includes at least one of the following parameters: 0.5 ms, 1 ms, 2 ms, 2.5 ms, 5 ms, 10 ms, 20 ms, 40 ms, 80 ms, and 160 ms, N≥2, and N is a positive integer.

With reference to the fourth aspect, in some possible implementations of the fourth aspect, the PSBCH payload includes one bit, and the one bit indicates the first device mode of the first terminal device.

With reference to the fourth aspect, in some possible implementations of the fourth aspect, the PSBCH payload includes three bits, the three bits indicate a fixed frame period when the first device mode of the first terminal device is a frame-based equipment mode, and the fixed frame period belongs to a third set. The third set includes at least one of the following parameters: 1 ms, 2 ms, 2.5 ms, 4 ms, 5 ms, and 10 ms. Alternatively, the three bits indicate that the first device mode of the first terminal device is a load-based equipment mode.

With reference to the fourth aspect, in some possible implementations of the fourth aspect, the PSBCH payload includes seven bits, the seven bits may indicate a slot index of the S-SSB, and the seven bits are generated at a physical layer.

According to a fifth aspect, a communication apparatus is provided, and the communication apparatus is configured to perform the communication method according to any one of the first aspect and the possible implementations of the first aspect and any one of the second aspect and the possible implementations of the second aspect.

According to a sixth aspect, a communication apparatus is provided, and includes a processor and a memory. The processor is coupled to the memory, the memory is configured to store a computer program, and the processor is configured to execute the computer program stored in the memory, so that the communication apparatus performs the communication method according to any one of the first aspect and the possible implementations of the first aspect, or the communication apparatus performs the communication method according to any one of the second aspect and the possible implementations of the second aspect.

According to a seventh aspect, a computer-readable storage medium is provided. The computer-readable storage medium stores instructions. When the instructions are run on a computer, the computer is enabled to perform the communication method according to any one of the first aspect and the possible implementations of the first aspect, or the computer is enabled to perform the communication method according to any one of the second aspect and the possible implementations of the second aspect.

According to an eighth aspect, a chip system is provided, and includes a processor and a communication interface, configured to invoke a computer program from a memory and run the computer program, so that a communication device on which the chip system is installed performs the communication method according to any one of the first aspect and the possible implementations of the first aspect, or the communication device on which the chip system is installed performs the communication method according to any one of the second aspect and the possible implementations of the second aspect.

According to a ninth aspect, a computer program product is provided. The computer program product stores computer-readable instructions, and when a communication apparatus reads and executes the computer-readable instructions, the communication apparatus is enabled to perform the method according to any one of the first aspect and the possible implementations of the first aspect and any one of the second aspect and the possible implementations of the second aspect.

According to a tenth aspect, a communication system is provided, and includes a first terminal device and a second terminal device. The first terminal device performs the method according to any one of the first aspect and the possible implementations of the first aspect, and the second terminal device performs the method according to any one of the second aspect and the possible implementations of the second aspect.

DETAILED DESCRIPTION OF ILLUSTRATIVE EMBODIMENTS

The following describes technical solutions of this application with reference to accompanying drawings.

The technical solutions of this application may be applied to the SL-U field, for example, the V2X and D2D fields.

Figure 1:
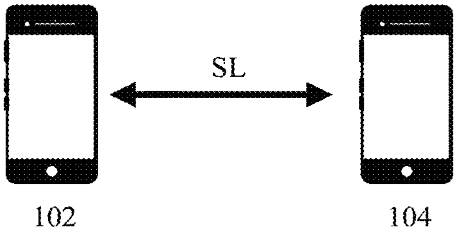
FIG. 1 is a schematic diagram of a D2D communication scenario according to this application.

FIG. 1 is a schematic diagram of a D2D communication scenario according to this application. In D2D communication, a link between a transmit end device and a receive end device is referred to as a sidelink (SL). A link between a terminal device and a network device is referred to as a downlink (DL) or an uplink (UL), an air interface of the link is also referred to as a Uu air interface, and corresponding DL communication and UL communication are also referred to as Uu communication.

In the D2D communication scenario shown in FIG. 1, the transmit end device may be used as a synchronization source, and send a sidelink synchronization signal block (S-SSB) to the receive end device by using an unlicensed spectrum, to maintain synchronization between the transmit end device and the receive end device.

It should be understood that both parties of SL communication are terminal devices.

The terminal device in embodiments of this application includes a device that provides a user with voice and/or data connectivity, for example, a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a D2D terminal device, a V2X terminal device, a machine-to-machine/machine-type communication (MTC) terminal device, an internet of things (IoT) terminal device, a subscriber unit, a subscriber station, a mobile station, a remote station, an access point, a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, the terminal-side device may be a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner. This is not limited in embodiments of this application.

The network device in embodiments of this application may be a device configured to communicate with the terminal device. The network device may be a base station (base transceiver station, BTS) in a GSM system or a CDMA system, or may be a NodeB (NB) in a WCDMA system, or may be an evolved NodeB (evolutional NodeB, eNB, or eNodeB) in an LTE system, or may be a radio controller in a cloud radio access network (CRAN) scenario. Alternatively, the network device may be a relay station, an access point, a vehicle-mounted device, a wearable device, a network device in a 5G network, a network device in a PLMN network, or the like. This is not limited in this embodiment of this application.

The following describes in detail the technical solutions in the embodiments of this application.

It should be understood that the following ordinal numbers "first", "second", "third", and the like are merely used to distinguish between different description objects, for example, distinguish between different terminal apparatuses or different pieces of information, but not indicate a time or priority sequence.

Figure 2:
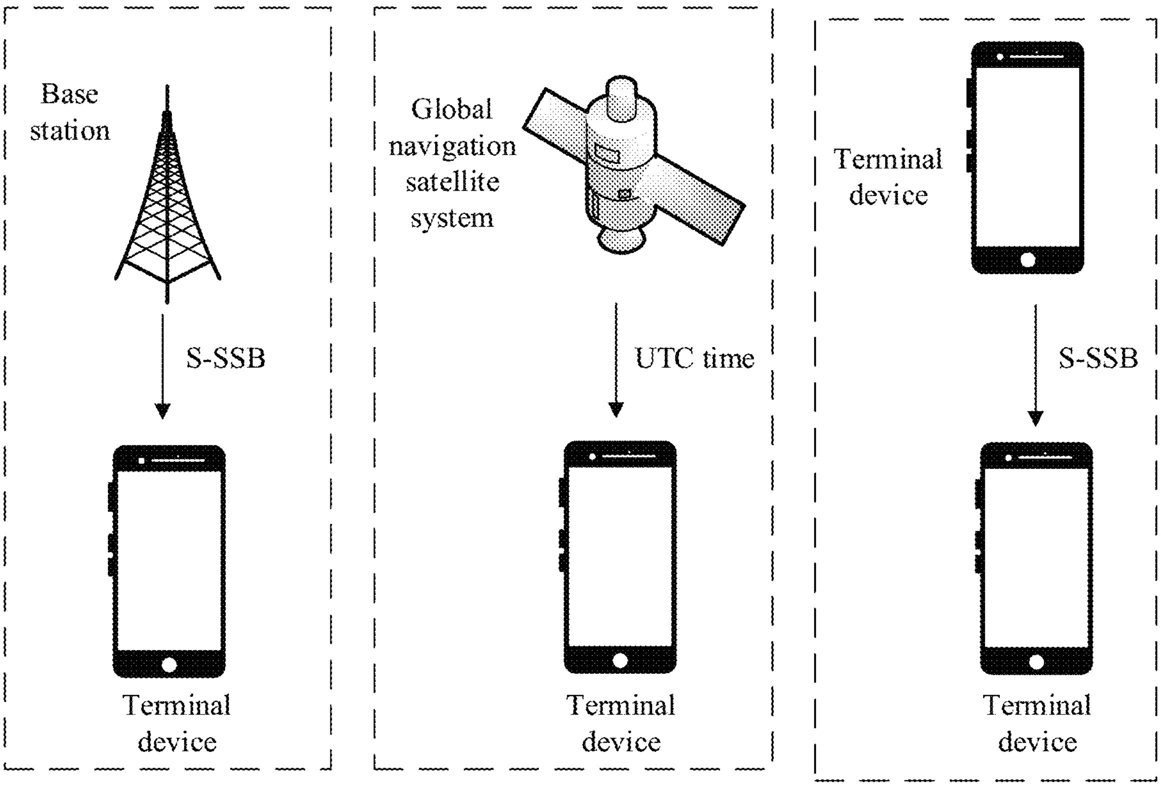
FIG. 2 is a schematic diagram of a synchronization process.

The following briefly describes related concepts in this application with reference to FIG. 2.

In a schematic diagram of three synchronization processes shown in FIG. 2, in a first synchronization manner, a base station sends a synchronization signal block (SSB) to a terminal device, and the terminal device aligns a symbol boundary based on the received SSB, aligns a slot based on a time domain position of the SSB, and aligns a radio frame based on a 10-bit system frame number (SFN) explicitly and/or implicitly included in the SSB, to complete a basic synchronization process. In a second synchronization manner, the terminal device receives coordinated universal time (UTC time) sent by a global navigation satellite system (GNSS), calculates a direct frame number (DFN), a subframe number, and a slot number based on the UTC time, and then aligns a radio frame, a slot, and a symbol, to complete a basic synchronization process. In a third synchronization manner, the terminal device receives an S-SSB sent by another terminal device, and aligns a radio frame and a slot based on a 10-bit DFN explicitly included in the S-SSB and a 7-bit slot index explicitly included in the S-SSB, to complete a basic synchronization process.

However, the foregoing synchronization methods are established when the terminal device determines, in a static or semi-static manner, a location for sending an S-SSB, and sends the S-SSB and corresponding control information and data information in a time division multiplexing (TDM) manner. The synchronization methods are applicable to a terminal device or a network device that operates in a licensed spectrum or an intelligent transportation system (ITS) spectrum, but are not applicable to a terminal device and another device that operate in an unlicensed spectrum, for example, a terminal device operating in an unlicensed spectrum shares the unlicensed spectrum with another network device that also uses the unlicensed spectrum. For example, a Wi-Fi device operating based on the IEEE 802.11 protocol also needs to enter channel access based on an LBT mechanism to use an unlicensed spectrum resource fairly and efficiently. However, when the spectrum resource is preempted by the Wi-Fi device, a device in the SL-U system cannot access a channel and transmit an S-SSB, and the device in the SL-U system cannot perform synchronization. Consequently, out-of-synchronization is caused and communication performance of the SL-U system deteriorates. In addition, content of a PSBCH payload included in the SSB or the S-SSB to which the foregoing synchronization method is applicable cannot meet requirements of the terminal device and the another device that operate in the unlicensed spectrum. For example, the unlicensed spectrum generates a new information transfer requirement for SL communication, that is, a new information needs to be added to the PSBCH payload.

In view of the foregoing problem, this application provides a synchronization method in an unlicensed spectrum, to enhance flexibility of sending an S-SSB by a terminal device, improve a channel access capability of the terminal device in an SL-U system, and improve synchronization performance of the SL-U system.

For ease of description, in the following, a transmit end device or a terminal device used as a synchronization source in SL-U communication is referred to as a first terminal device, and a receive end device or a terminal device receiving a synchronization signal is referred to as a second terminal device.

The first terminal device and the second terminal device each may be a terminal device, or a chip installed in the terminal device, or a combined device, a component, or the like that can implement the following method functions in the terminal device. This is not limited in this application.

Figure 3:
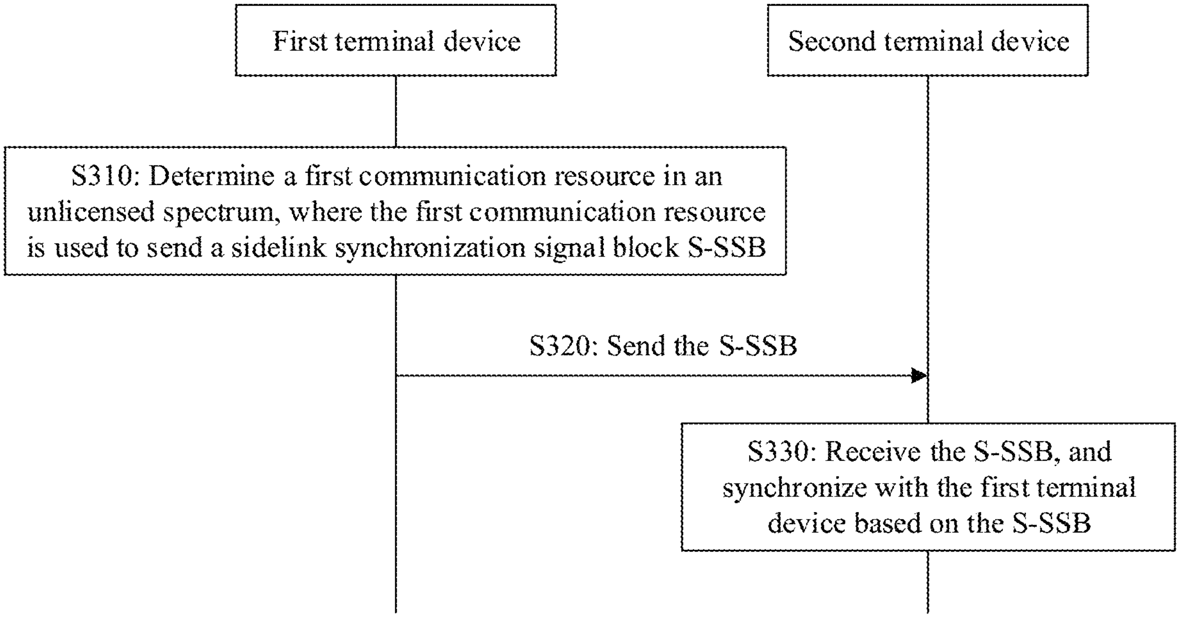
FIG. 3 is a schematic flowchart of a synchronization method according to this application.

FIG. 3 is a schematic flowchart of a synchronization method in an unlicensed spectrum according to this application. The method is performed by a first terminal device and a second terminal device. The synchronization method is as follows:

S310: The first terminal device determines a first communication resource in the unlicensed spectrum, where the first communication resource is used to transmit a sidelink synchronization signal block S-SSB.

S320: The first terminal device sends the S-SSB to the second terminal device on the first communication resource.

S330: The second terminal device receives the S-SSB, and synchronizes with the first terminal device based on the S-SSB.

According to the foregoing technical solutions, flexibility of sending the S-SSB by the terminal device can be enhanced, and synchronization performance of an SL-U system can be improved in this application.

It should be understood that the S-SSB sent by the first terminal device to the second terminal device on the first communication resource determined in the unlicensed spectrum is used for synchronization between the second terminal device and the first terminal device.

The first terminal device determines the first communication resource in the unlicensed spectrum, and sends the S-SSB on the first communication resource. The first communication resource may include a frequency domain resource and/or a time domain resource.

Based on different resource types, this application further includes the following technical solutions, and there are roughly three cases: a case #A, a case #B, and a case #C. Details are as follows:

Case A: The frequency domain resource of the first communication resource is L resource blocks (RB) in a first bandwidth part (BWP), and L is a positive integer. The first BWP is a set of several consecutive RBs on a given carrier, and the terminal device can send control information and/or data information in the first BWP, or may receive control information and/or data information in the first BWP.

For ease of description, a quantity of consecutive RBs included in the first BWP may be denoted as K, and L is less than or equal to K, to indicate that the first terminal device may use a part or all of RBs in the first BWP to send the S-SSB. This is not limited in this application.

The K consecutive RBs included in the first BWP may include a first resource group and a second resource group. The first resource group includes L RBs, and the second resource group belongs to remaining K-L RBs. That is, the second resource group may be a part of the K-L RBs, or may be all of the K-L RBs. The K-L RBs are remaining RBs other than the first resource group in the first BWP.

The first terminal device determines the first resource group in the first BWP configured or preconfigured by the network, and sends the S-SSB to the second terminal device on the first resource group, to keep synchronization between the second terminal device and the first terminal device.

The first terminal device sends the S-SSB on the first resource group, and sends first information on the second resource group. It should be understood that the first information may be a physical sidelink control channel (PSCCH) and/or a physical sidelink shared channel (PSSCH) that are/is sent by the first terminal device on the second resource group. The PSCCH is used to transmit SL control information, and the PSSCH is used to transmit SL data information. This is not limited in this application.

In the case #A, based on whether the L RBs in the first resource group are consecutive, this application further includes the following technical solutions: #a and #b, which are specifically shown as follows:

#a: When the L RBs included in the first resource group are consecutive, the first terminal device may simultaneously send the first information and the S-SSB on a first time domain resource, or may send only the S-SSB on a first time domain resource. It should be understood that the time domain resource of the first communication resource is the first time domain resource.

Figure 4:
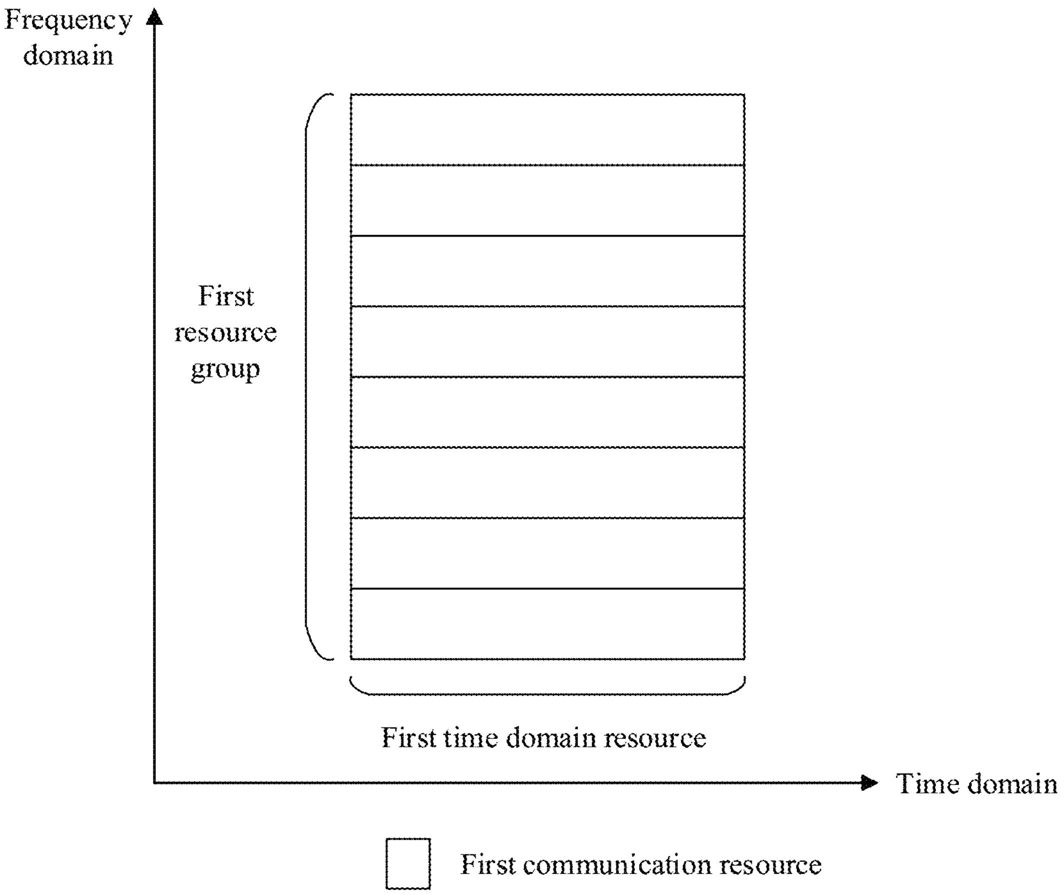
FIG. 4 is a schematic diagram of a distribution of communication resources in a synchronization method according to this application.

FIG. 4 is a schematic diagram of a distribution of communication resources in a synchronization method according to this application, namely, a schematic diagram of a correspondence between the first communication resource, the first resource group, and the first time domain resource. Details are shown in FIG. 4.

On the first time domain resource, the first terminal device can simultaneously send the S-SSB on the first resource group and send the first information on the second resource group.

The first terminal device simultaneously sends the S-SSB and the first information on the first time domain resource in a frequency division multiplexing (FDM) manner. In the FDM manner, the first terminal device can avoid a case in which another device in the unlicensed spectrum, for example, a network device such as a Wi-Fi device, preempts a communication resource by using an LBT mechanism because a part of frequency domain resources are not used. In addition, the FDM manner can enhance flexibility of sending the S-SSB by the first terminal device, and effectively improve communication performance of the SL-U system.

It should be understood that the first terminal device may send the first information to a third terminal device in first time domain, and the third terminal device may be a terminal device including the second terminal device, or may be a terminal device other than the second terminal device. This is not limited in this application.

The first time domain resource may be a resource in a unit of a slot, a subframe, a radio frame, a mini-slot, or an orthogonal frequency division multiplexing (OFDM) symbol. Further, optionally, the first terminal device can send the first information on the second resource group. The second resource group belongs to a first interlaced resource block group, the first interlaced resource block group includes at least one interlaced resource block (interlaced RBs), and an index value difference between two adjacent RBs in one interlaced resource block is equal to 5 or 10.

It should be understood that RBs in an interlaced resource block are discrete on the frequency domain resource, and an index value difference between two adjacent RBs is 5 or 10, that is, 4 or 9 RBs are spaced between two logically adjacent RBs. The information is mapped to the interlaced resource block in a decentralized manner, so that more than 80% of a bandwidth B of the allocated unlicensed spectrum can be effectively occupied. A typical value of B is 20 MHz, 40 MHz, 80 MHz, or the like.

For example, when a subcarrier spacing (SCS) of the first BWP is 15 kHz, one interlaced resource block includes RBs whose indexes are $\{m, m+10, m+20, \ldots\}$, and a value range of m includes 10 values such as $\{0, 1, 2, \ldots, 9\}$. Therefore, the first BWP includes 10 interlaced resource blocks.

For example, when the SCS of the first BWP is 30 kHz, one interlaced resource block includes RBs whose indexes are $\{m, m+5, m+10, \ldots\}$, and a value range of m includes five values such as {0, 1, 2, 3, 4}. Therefore, the first BWP includes five interlaced resource blocks.

Figure 5:
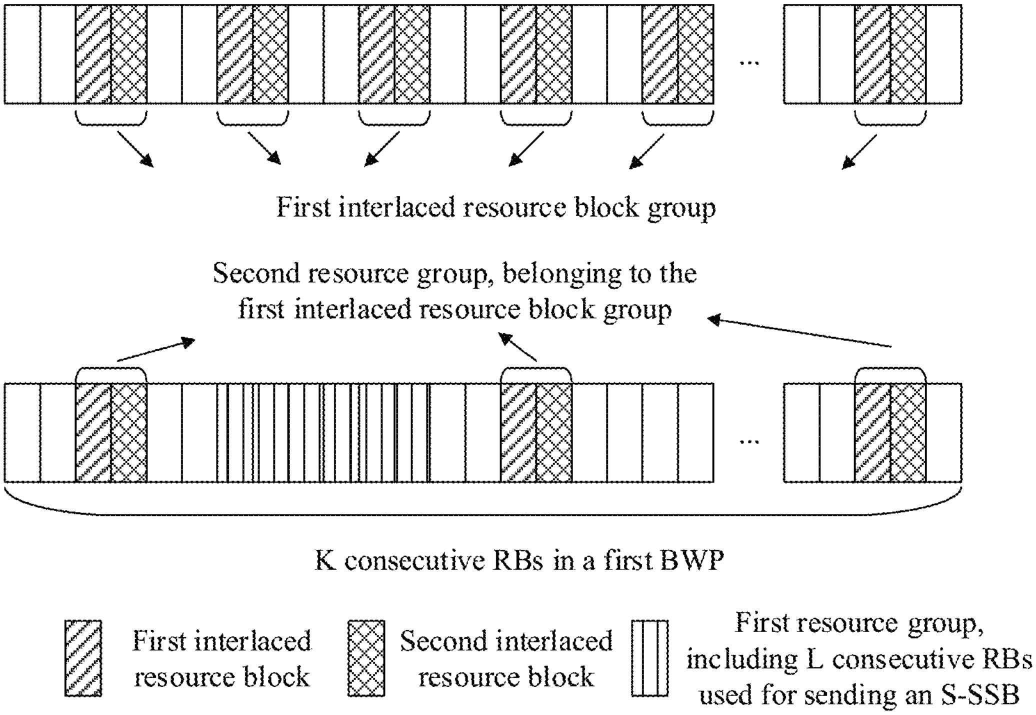
FIG. 5 is a schematic diagram of another distribution of frequency domain resources in a synchronization method according to this application.

FIG. 5 is a schematic diagram of a distribution of frequency domain resources in a synchronization method when the SCS of the first BWP is 30 kHz. Details are shown in FIG. 5.

In the schematic diagram shown in FIG. 5, the first BWP includes 50 consecutive RBs, that is, K=50, where 11 consecutive RBs are used to transmit the S-SSB, that is, L=11, and it also indicates that the first resource group includes the 11 consecutive RBs. The first terminal device sends the first information on the second resource group. The second resource group belongs to a first interlaced resource block group including two interlaced resource blocks, and a first interlaced resource block and a second interlaced resource block in the two interlaced resource blocks respectively include RBs whose indexes are {2, 7, 12, . . . , 47} and RBs whose indexes are {3, 8, 13, . . . , 48}.

It should be understood that when the first terminal device needs to send the first information on the first interlaced resource block group, the first terminal device sends the first information on the second resource group, and the second resource group belongs to the first interlaced resource block group but does not belong to the first resource group. The first terminal device sends the S-SSB on the first resource group, and a part or all of RBs in the first resource group may belong to the first interlaced resource block group. In other words, the terminal device may send the first information by skipping an RB that is in the first interlaced resource block group and that overlaps the first resource group.

It should be understood that when the first BWP includes a plurality of interlaced resource blocks, the second resource group belongs to RBs included in the plurality of interlaced resource blocks.

#b: When the L RBs included in the first resource group are inconsecutive, the first terminal device may send the S-SSB on the interlaced resource block.

When the first terminal device sends the S-SSB on L inconsecutive RBs, the first terminal device sends the S-SSB on the first resource group, and the first resource group includes at least one interlaced resource block.

Figure 6:
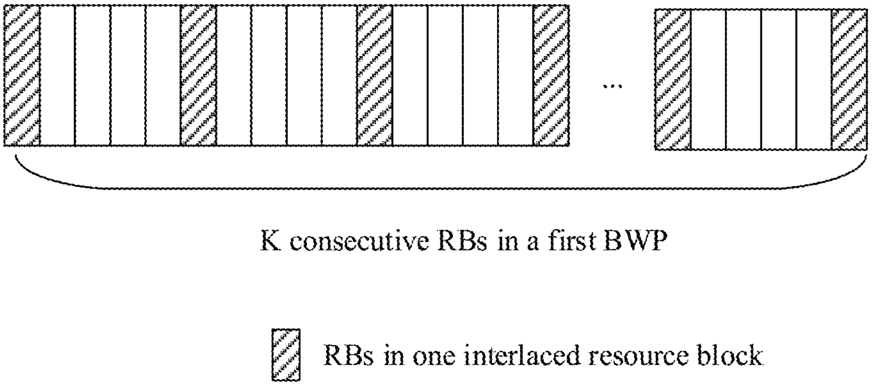
FIG. 6 is a schematic diagram of still another distribution of frequency domain resources in a synchronization method according to this application.

It should be understood that when the first BWP includes a plurality of interlaced resource blocks, the first terminal device may send the S-SSB on an RB in the at least one interlaced resource block. Specifically, as shown in FIG. 5, the first terminal device may send the S-SSB on an interlaced resource block including RBs whose index numbers are {0, 5, 10, 15, 20, 25, 30, 35, 40, 45, 50}. It should be understood that the scenario described in FIG. 6 is merely used as an example for description, and does not have a limitation function.

The first terminal device simultaneously sends the S-SSB and the first information in an FDM manner, or sends the S-SSB on an interlaced resource block. This can avoid a risk that another device such as a Wi-Fi device preempts a communication resource by using the LBT mechanism because a part of spectrum resources are idle, and can effectively improve communication performance of the SL-U system.

The RB used to send the first information is mapped to an interlaced resource block other than the first resource group used to send the S-SSB. In this application, the first terminal device can use the interlaced resource block more properly, and it can also be ensured that an SL-U device occupies more than 80% of the bandwidth B of the allocated unlicensed spectrum. This avoids a risk that another device such as a Wi-Fi device preempts a communication resource by using the LBT mechanism because a part of frequency domain resources are idle.

Case B: The frequency domain resource of the first communication resource is N third resource groups in the second BWP. The third resource group includes M consecutive RBs, N indicates a quantity of S-SSBs sent by the first terminal device in the second BWP, M consecutive RBs included in one third resource group indicate a quantity of RBs occupied by sending one S-SSB by the first terminal device, a product of N and M is less than or equal to Y, and N, M, and Y are all positive integers.

The terminal device can send the control information and/or the data information in the second BWP, or may receive the control information and/or the data information in the second BWP.

It should be understood that, compared with mapping the S-SSB to discrete interlaced resource blocks, mapping one S-SSB to consecutive RBs can enable the second terminal device to receive the S-SSB more effectively and accurately. This improves synchronization reliability.

In addition, this sending manner can also avoid a risk that another device such as a Wi-Fi device preempts a communication resource by using the LBT mechanism because a part of frequency domain resources are idle, and can effectively enhance communication performance of the SL-U system.

Optionally, on a second time domain resource used to send the S-SSB, the first terminal device simultaneously sends N S-SSBs on the N third resource groups in the second BWP, there is a same quantity X of spaced RBs between two adjacent third resource groups in the N third resource groups, and X is configured by the network device, preconfigured, or predefined.

It should be understood that the quantity X of spaced RBs between two adjacent third resource groups is specified to be the same. In this way, frequency domain positions of the N third resource groups can be configured more conveniently, and signaling overheads can be reduced.

Figure 7:
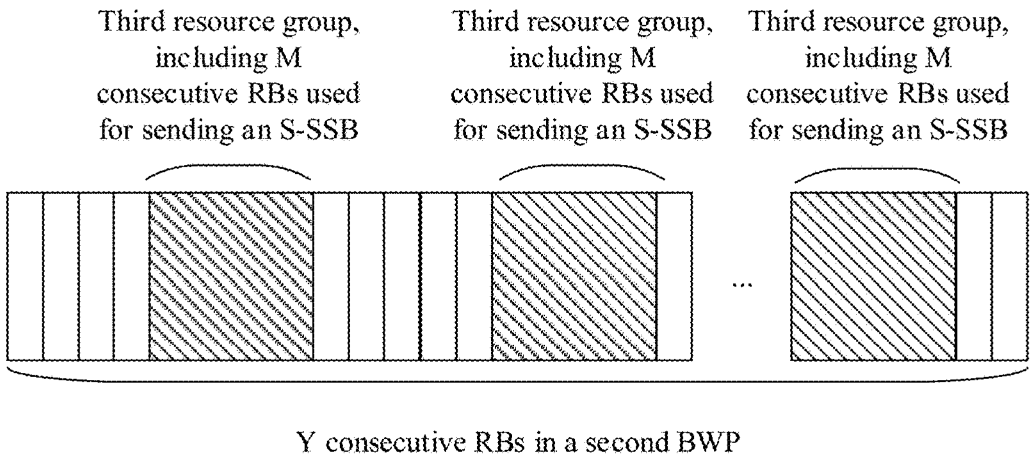
FIG. 7 is a schematic diagram of yet another distribution of frequency domain resources in a synchronization method according to this application.

FIG. 7 is a schematic diagram of a distribution of frequency domain resources in a synchronization method according to this application. Specifically, as shown in FIG. 7, in a second BWP, one BWP includes Y=51 consecutive RBs, and the first terminal device sends the S-SSB on N=3 frequency domain resources. Each frequency domain resource includes M=11 consecutive RBs, and there is a same quantity of spaced RBs between every two adjacent frequency domain resources, that is, X=5.

It should be understood that, in the foregoing description, the total RBs that are occupied by the first terminal device in the first BWP or the second BWP and that are used to send the S-SSB and/or send the first information need to occupy more than 80% of the bandwidth B of the allocated unlicensed spectrum, that is, a regulation requirement of the unlicensed spectrum needs to be met. This can effectively avoid a case in which the Wi-Fi device preempts a communication resource by using an idle frequency domain resource, and consequently, the first terminal device cannot effectively access a channel, and further cannot send the S-SSB to another terminal device, and cannot perform synchronization.

It should be understood that the first BWP or the second BWP may be configured or preconfigured by the network device.

Case C: The time domain resource of the first communication resource corresponds to a first moment, the first terminal device determines a second communication resource based on the first moment and first duration, and the second communication resource is used to send a second S-SSB.

It should be understood that the time domain resource may be a resource in a unit of a slot, a subframe, a radio frame, a mini-slot, or an OFDM symbol. In this application, a correspondence between a time domain resource and a moment may be that the moment is an end point of the time domain resource. For example, if the time domain resource is a single slot in a unit of a slot, the moment is an end point of the single slot.

Figure 8:
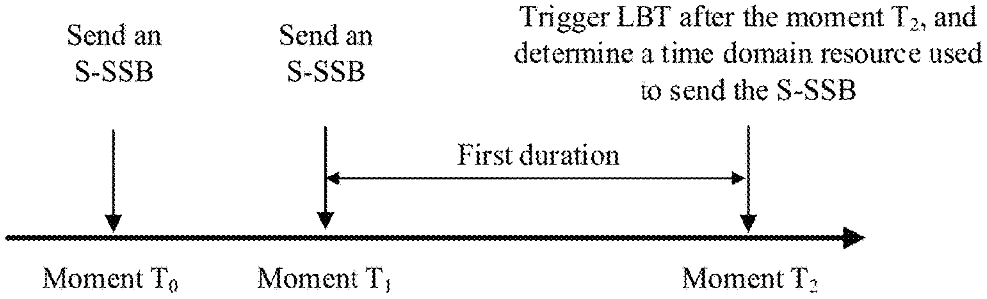
FIG. 8 is a schematic diagram of a distribution of time domain resources in a synchronization method according to this application.
Figure 9:
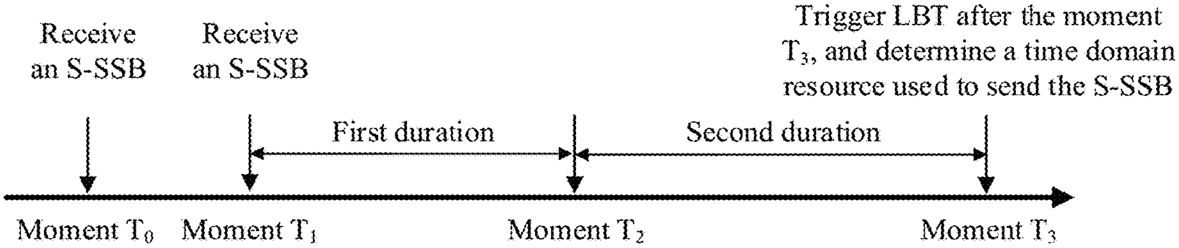
FIG. 9 is a schematic diagram of another distribution of time domain resources in a synchronization method according to this application.

With reference to FIG. 8 and FIG. 9, the following describes a technical solution when the type of the first communication resource is a time domain resource.

In the scenario shown in FIG. 8, the first terminal device sends the S-SSB to the second terminal device on a time domain resource corresponding to a moment $T_0$, starts timing from the moment $T_0$, continues to search for a next resource for sending the S-SSB in the time period of the first duration, and sends the next S-SSB at a moment $T_1$. $T_1$ is within the first duration starting from the moment $T_0$. After sending the S-SSB at the moment $T_1$, the first terminal device starts timing at the moment $T_1$, and searches for, in a time period of subsequent first duration, a resource for sending the S-SSB next time.

It should be understood that, when the first terminal device starts timing from the moment $T_0$ and searches for a next resource that can be used to send the S-SSB, the moment $T_0$ is the first moment, and a time domain resource corresponding to the moment $T_0$ is a time domain resource of the first communication resource. When determining a communication resource used to send a new S-SSB, the first terminal device preferentially searches for a resource within the first duration starting from the moment $T_0$.

It should be understood that a time length of the first duration may be 40 ms, 80 ms, or another value. This is not limited in this application.

It should be understood that when the first terminal device starts timing from the moment $T_1$ and searches for a next resource that can be used to send the S-SSB, the moment $T_1$ is the first moment, a time domain resource corresponding to the moment $T_1$ is a time domain resource of the first communication resource, and a new S-SSB sent by the first terminal device to the second terminal device again after the moment $T_1$ is the second S-SSB. When determining the second communication resource used to send the second S-SSB, the first terminal device preferentially searches for a communication resource whose time domain resource is within the first duration starting from the moment $T_1$.

In this application, the time domain resource used to send the S-SSB is determined in a dynamic manner instead of a static or semi-static manner. In this way, the first terminal device can frequently send the S-SSB, and configurability and flexibility of synchronization in the SL-U system can be improved.

When the first terminal device does not find, within the first duration starting from the moment $T_1$, an appropriate resource used to send the S-SSB, the first terminal device needs to trigger the LBT mechanism after the moment $T_2$, and determine the second communication resource used to send the second S-SSB. The moment $T_2$ is a moment corresponding to the moment $T_1$ plus the first duration, and sends the S-SSB to the second terminal device again on a time domain resource after the moment $T_2$.

It should be understood that in this case, the moment $T_1$ is the first moment, the moment $T_2$ is the second moment, the time domain resource of the second communication resource corresponds to a third moment, the third moment is not earlier than the second moment, a difference between the second moment and the first moment is the first duration, and the new S-SSB sent by the first terminal device to the second terminal device again after the moment $T_1$ is the second S-SSB.

According to the foregoing technical solution, when the first terminal device fails to successfully send the S-SSB within the first duration of the S-SSB, the first terminal device still finds an available time domain resource within the first duration as soon as possible, and sends the S-SSB to the second terminal device, to maintain synchronization in the SL-U system.

It should be understood that the first duration may be a time window, or may be a time threshold set for the counter. For example, the counter immediately starts timing each time the first terminal device sends the S-SSB. The first terminal device preferentially sends the S-SSB again to the second terminal device before the counter reaches the time threshold. If no S-SSB is sent again by the first terminal device to the second terminal device after the time threshold is reached, the LBT mechanism is triggered. In this way, even if the first terminal device fails to successfully send the S-SSB within the first duration, the first terminal device still finds an available time domain resource beyond the first duration as soon as possible, and sends the S-SSB, to maintain synchronization in the SL-U system.

For ease of description, in this application, the first duration is used to describe the technical solutions of this application. However, this description manner does not have a limitation function. For example, in this application, concepts such as a time window and a counter may be further used to describe the technical solutions of this application.

In the scenario shown in FIG. 9, the second terminal device receives the S-SSB on a time domain resource corresponding to a moment $T_0$, starts timing from the moment $T_0$, monitors and receives a next S-SSB in a time period of first duration, and receives the next S-SSB at a moment $T_1$. After receiving the S-SSB at the moment $T_1$, the second terminal device starts timing at the moment $T_1$, and monitors and receives the next S-SSB in the time period of the subsequent first duration.

It should be understood that when the second terminal device starts timing from the moment $T_0$ and monitors and receives the next S-SSB, the moment $T_0$ is the first moment, and a time domain resource corresponding to the moment $T_0$ is a time domain resource of the first communication resource. A new S-SSB that is received by the second terminal device again from the first terminal device after the moment $T_0$ is the second S-SSB. When determining the second communication resource used to send the second S-SSB, the first terminal device preferentially enables the time domain resource of the second communication resource to be within the first duration starting from the moment $T_0$.

It should be understood that when the second terminal device starts timing from the moment $T_1$ and monitors and receives the next S-SSB, the moment $T_1$ is the first moment, and a time domain resource corresponding to the moment $T_1$ is a time domain resource of the first communication resource. A new S-SSB that is received by the second terminal device again from the first terminal device after the moment $T_1$ is the second S-SSB. When determining the second communication resource used to send the second S-SSB, the first terminal device preferentially enables the time domain resource of the second communication resource to be within the first duration starting from the moment $T_1$.

When the second terminal device receives no new S-SSB from the first terminal device within the first duration starting from the moment $T_1$, the second terminal device needs to monitor and receive the new S-SSB within second duration starting from a moment $T_2$, and the moment $T_2$ is a moment corresponding to the moment $T_1$ plus the first duration.

It should be understood that in this case, the moment $T_1$ is the first moment, the moment $T_2$ is the second moment, and the new S-SSB that is from the first terminal device and that is received by the second terminal device again after the moment $T_1$ is the second S-SSB. The first terminal device needs to trigger the LBT mechanism after the moment $T_2$, determine the second communication resource used to send the second S-SSB, and send a new S-SSB to the second terminal device again on a time domain resource after the moment $T_2$.

When the second terminal device receives no new S-SSB from the first terminal device within first duration starting from the moment $T_1$ and within second duration starting from the moment $T_2$, the second terminal device needs to trigger the LBT mechanism after the moment $T_3$, determine a third communication resource used to send a third S-SSB, and send the S-SSB to a fourth terminal device on a time domain resource after the moment $T_3$. The moment $T_2$ is a moment corresponding to the moment $T_1$ plus the first duration, and the moment $T_3$ is a moment corresponding to the moment $T_2$ plus the second duration.

When the second terminal device receives, within the first duration and the second duration, no S-SSB sent by the first terminal device, the second terminal device determines the third communication resource, and the third communication resource is used to send the S-SSB. According to this technical solution, in this application, the second terminal device can also be used as a synchronization source, and send the S-SSB to another terminal device, to maintain synchronization in the SL-U system.

It should be understood that in this case, the moment $T_1$ is the first moment, the moment $T_2$ is the second moment, and the moment $T_3$ is the third moment. A time domain resource of the third communication resource corresponds to a fourth moment, and the fourth moment is not earlier than the third moment. A difference between the second moment and the first moment is the first duration, a difference between the third moment and the second moment is the second duration, and the S-SSB sent by the second terminal device to the fourth terminal device after the moment $T_1$ is the third S-SSB.

It should be understood that the fourth terminal device may be a terminal device including the first terminal device, or may be a terminal device other than the first terminal device. This is not limited in this application.

It should be understood that time lengths of the first duration and the second duration may be respectively 40 ms and 80 ms, or may be another value. This is not limited in this application.

It should be understood that in this case, the second terminal device sends no S-SSB before, but performs synchronization by receiving the S-SSB of the first terminal device. The second terminal device receives the S-SSB based on the first duration of the S-SSB indicated by the first terminal device. However, the second terminal device receives, within the first duration of the S-SSB, no S-SSB sent by the first terminal device. Then, the second terminal device waits to receive the S-SSB based on the second duration of the S-SSB configured for the second terminal device. If the S-SSB is still not received, the second terminal device is used as a synchronization source, and can send the S-SSB to the fourth terminal device.

When the second terminal device cannot receive the S-SSB sent by the first terminal device, the second terminal device may send the S-SSB to the fourth terminal device, to maintain synchronization in the SL-U system.

According to the foregoing technical solution, when the first terminal device fails to successfully send the S-SSB within the second duration of the S-SSB, the second terminal device can be used as a synchronization source to send the S-SSB to another terminal device, to maintain synchronization of the SL-U system. Optionally, the first duration of the S-SSB is in a unit of ms, and a candidate value set of the first duration includes at least one of the following parameters: {0.5 ms, 1 ms, 2 ms, 2.5 ms, 5 ms, 10 ms, 20 ms, 40 ms, 80 ms, 160 ms}.

It should be understood that the first duration is in a unit of ms, which is merely used as an example for description, and does not have a limitation function. The first duration may alternatively be in a unit of second, microsecond, or the like. This is not limited in this application.

Optionally, the first duration of the S-SSB is in a unit of a slot, a mini-slot, an OFDM symbol, or the like, and a candidate value set of the first duration includes at least one of the following parameters: {1, 2, 4, 5, 10, 20, 40, 80, 160, 320}.

According to the foregoing technical solution, when the second terminal device receives no S-SSB sent by the first terminal device for a long time, the second terminal device actively triggers the LBT mechanism, determines a communication resource used to send the S-SSB, and is used as a synchronization source to send the S-SSB to the fourth terminal device. The S-SSB is used for synchronization between the fourth terminal device and the second terminal device, to maintain communication performance of the SL-U system.

In step S330, the second terminal device receives the S-SSB, and synchronizes with the first terminal device based on the S-SSB.

The second terminal device synchronizes with the first terminal device based on the received S-SSB. For example, a PSBCH payload in the S-SSB is obtained, and synchronization is performed based on a DFN and a slot index in the PSBCH payload. For another example, a synchronization signal in the S-SSB is obtained, and synchronization is performed with the first terminal device based on the synchronization signal.

This application provides an S-SSB sending method applicable to the SL-U system, and provides a specific method for determining a frequency domain resource and/or a time domain resource used to transmit the S-SSB. This improves flexibility of sending the S-SSB by the first terminal device, and is more compatible with an LBT-based channel access method in an unlicensed spectrum, thereby improving a channel access capability of the SL-U device, and improving synchronization performance of the SL-U system.

Specifically, from a perspective of a frequency domain resource, this application proposes a method for sending an S-SSB by the first terminal device by properly using a bandwidth in a BWP. Optionally, the first terminal device may send both an S-SSB and first information in an FDM manner. From a perspective of a time domain resource, this application provides a method for dynamically determining a time domain position of an S-SSB based on a time window or duration, to improve flexibility of transmitting the S-SSB by the SL-U device.

Figure 10:
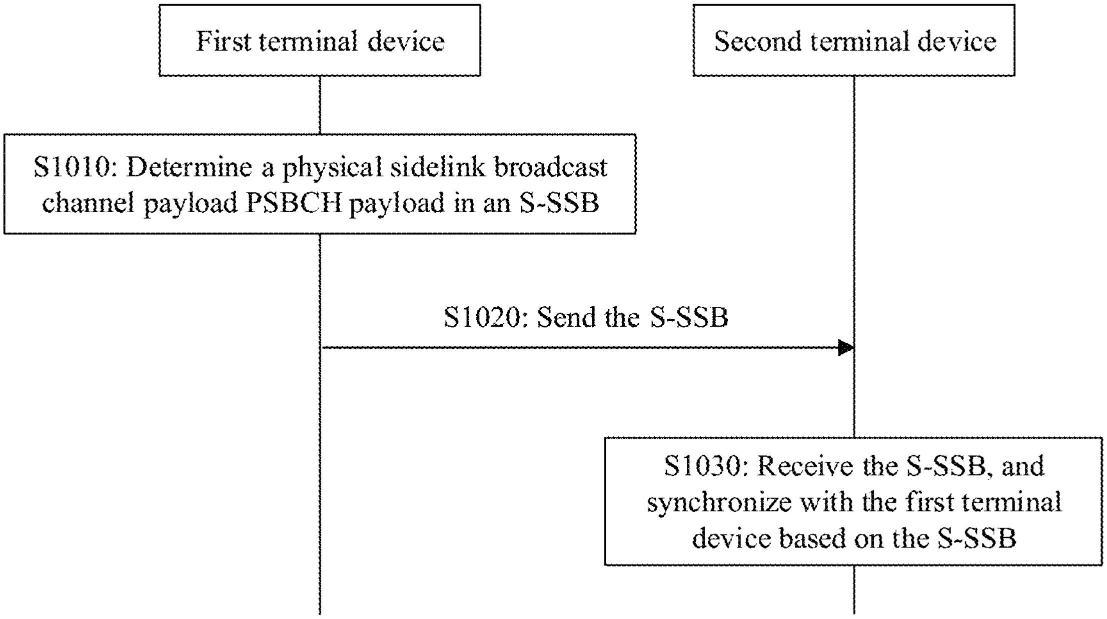
FIG. 10 is a schematic flowchart of another synchronization method according to this application.

With reference to FIG. 10, the following describes another synchronization method in an unlicensed spectrum to which this application is applicable. Specific technical solutions are as follows:

S1010: A first terminal device determines a physical sidelink broadcast channel payload PSBCH payload in an S-SSB.

The first terminal device determines the PSBCH payload in the S-SSB. The PSBCH payload may include at least one of the following parameters: a sending period of the S-SSB, first duration of the S-SSB, and a first device mode, and the first device mode includes a load-based equipment (LBE) mode or a frame-based equipment (FBE) mode.

The first duration of the S-SSB is used to determine a time domain resource of the S-SSB. The LBE mode and the FBE mode are two manners of performing channel access in the unlicensed spectrum. The former mainly performs channel access in a dynamic manner, and the latter mainly performs channel access in a semi-static manner. For example, a Wi-Fi device is a typical network device operating in the LBE mode, and an NR-U device may operate in both the LBE mode and the FBE mode.

The first terminal device notifies another terminal device of related indication information such as a time domain mode of sending the S-SSB by the first terminal device in time domain, such as a sending period or a sending time window, to implement a function such as determining a synchronization priority. This method can be more compatible with an LBT mechanism-based channel access method in the unlicensed spectrum, and can effectively improve synchronization performance of the SL-U system.

Optionally, the PSBCH payload may include M bits, the M bits indicate the sending period of the S-SSB, the sending period of the S-SSB belongs to a first set, and the first set may include at least one of the following parameters: {5 ms, 10 ms. 20 ms, 40 ms, 80 ms, 160 ms}. In this way, the first terminal device may indicate the sending period of the S-SSB by using the S-SSB. This helps a second terminal device receive the S-SSB, and helps the second terminal device determine the synchronization priority based on the indicated sending period of the S-SSB. A value of M is greater than or equal to 2. For example, the value of M is 2 or 3.

The first terminal device may indicate the sending period of the S-SSB by using the S-SSB. This helps the second terminal device receive the S-SSB, and helps the second terminal device determine the synchronization priority based on the indicated sending period of the S-SSB.

Optionally, the PSBCH payload includes N bits, the N bits indicate the first duration of the S-SSB, the first duration belongs to a second set, and the second set includes at least one of the following parameters: {0.5 ms, 1 ms, 2 ms, 2.5 ms, 5 ms, 10 ms, 20 ms, 40 ms, 80 ms, 160 ms}. In this way, the first terminal device may indicate the first duration of the S-SSB by using the S-SSB. This helps the second terminal device receive the S-SSB, and helps the second terminal device determine the synchronization priority based on the indicated first duration of the S-SSB. A value of N may be greater than or equal to 2. For example, the value of N is 2 or 3.

It should be understood that the first duration may be a time window, or may be a time threshold set for the counter. For example, the counter immediately starts timing each time the first terminal device sends the S-SSB.

The first terminal device may indicate the first duration of the S-SSB by using the S-SSB. This helps the second terminal device receive the S-SSB, and helps the second terminal device determine the synchronization priority based on the indicated first duration of the S-SSB.

Optionally, the PSBCH payload includes one bit, and the one bit indicates whether the first device mode of the terminal device is the LBE mode or the FBE mode. In this way, the second terminal device may determine, based on the received S-SSB, whether the SL-U system performs channel access in the LBE mode or in the FBE mode, to use a communication resource in a same channel access manner.

The second terminal device may determine, based on the received S-SSB, whether the SL-U system performs channel access in an LBE mode or in an FBE mode, to use a communication resource in a same channel access manner.

Optionally, the PSBCH payload includes Z bits, the Z bits indicate a fixed frame period (FFP) when the first device mode of the first terminal device is the FBE mode, the fixed frame period belongs to a third set, and the third set includes at least one of the following parameters: {1 ms, 2 ms, 2.5 ms, 4 ms, 5 ms, 10 ms}. Alternatively, the Z bits may indicate that the first device mode of the first terminal device is the LBE mode. A value of Z may be greater than or equal to 3. For example, the value of Z is 3.

It should be noted that the FFP is a necessary parameter for the first terminal device to perform channel access in the FBE mode. When the first terminal device operates in the FBE mode, the first terminal device may indicate the FFP by using the S-SSB, and the second terminal device may determine, based on the received S-SSB, the FFP used by the SL-U system to perform channel access in the FBE mode, to use a communication resource more properly.

Further, optionally, the first terminal device determines 3-bit indication information $\{a_0, a_1, a_2\}$ by using Table 1 or Table 2. When the 3-bit indication information is an index that is not listed in Table 1 or Table 2, it indicates that the operating mode of the first terminal device is the LBE mode. For example, the first terminal device determines 3-bit indication information $\{a_0, a_1, a_2\}$ by using Table 1. If the operating mode of the first terminal device is the LBE mode, the 3-bit indication information $\{a_0, a_1, a_2\}=\{1, 1, 1\}$.

TABLE 1

Example of indicating an FFP by using 3 bits

| $a_0$ | $a_1$ | $a_2$ | FFP |
|---|---|---|---|
| 0 | 0 | 0 | 1 ms |
| 0 | 0 | 1 | 2 ms |
| 0 | 1 | 0 | 2.5 ms |
| 0 | 1 | 1 | 4 ms |
| 1 | 0 | 0 | 5 ms |
| 1 | 0 | 1 | 10 ms |
| Reserved | | | Reserved |

TABLE 2

Another example of indicating an FFP by using 3 bits

| $a_0$ | $a_1$ | $a_2$ | FFP |
|---|---|---|---|
| 0 | 0 | 1 | 1 ms |
| 0 | 1 | 0 | 2 ms |
| 0 | 1 | 1 | 2.5 ms |
| 1 | 0 | 0 | 4 ms |
| 1 | 0 | 1 | 5 ms |
| 1 | 1 | 0 | 10 ms |
| Reserved | | | Reserved |

It should be understood that the foregoing content is merely used as an example for description, and does not have a limitation function. In this application, another combination of three bits or a combination of a plurality of bits may indicate a value of the FFP when the first device mode of the first terminal device is the FBE mode, or indicate that the first device mode of the first terminal device is the LBE mode. This is not limited in this application.

When the first terminal device operates in the FBE mode, the first terminal device may indicate an FFP by using the S-SSB, and the second terminal device may determine, based on the received S-SSB, the FFP used by the SL-U system to perform channel access in the FBE mode, to use a communication resource more properly. When the first terminal device operates in the LBE mode, the first terminal device may also indicate, by using the S-SSB, that the first terminal device is in the LBE mode, and the second terminal device may determine, based on the received S-SSB, that the SL-U system performs channel access in the LBE mode, to use a communication resource more properly.

Optionally, the first terminal device generates a 7-bit slot index in the PSBCH payload at a physical layer. In this way, the first terminal device can more flexibly generate the PSBCH payload, dynamically send the S-SSB, and improve synchronization performance of the SL-U system.

S1020: The first terminal device sends the S-SSB to the second terminal device.

It should be understood that the S-SSB includes the PSBCH payload in step Slow. The first terminal device sends the S-SSB to the second terminal device, that is, sends the PSBCH payload to the second terminal device.

S1030: The second terminal device receives the S-SSB, and synchronizes with the first terminal device based on the S-SSB.

It should be understood that content of step S1030 is the same as that of step S330, and details are not described herein again.

This application provides a PSBCH payload generation method applicable to the SL-U system, and new indication information is additionally introduced into the PSBCH payload. This is more compatible with an LBT-based channel access method in the unlicensed spectrum, and effectively improves synchronization performance of the SL-U system.

Specifically, from a perspective of carried indication information, in this application, new indication information is additionally introduced into the PSBCH payload, so that the first terminal device can send indication information related to the synchronization or the channel access mode to a surrounding terminal device by using the S-SSB. This facilitates cooperative work between SL-U devices. From a perspective of a generation manner, in this application, the first terminal device can generate indication information of a slot index at the physical layer. In this way, the first terminal device can more flexibly generate the PSBCH payload, dynamically send the S-SSB, and improve synchronization performance of the SL-U system.

Figure 11:
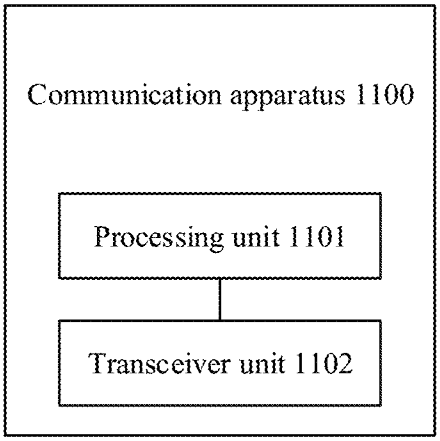
FIG. 11 is a schematic block diagram of a communication apparatus according to this application.
Figure 12:
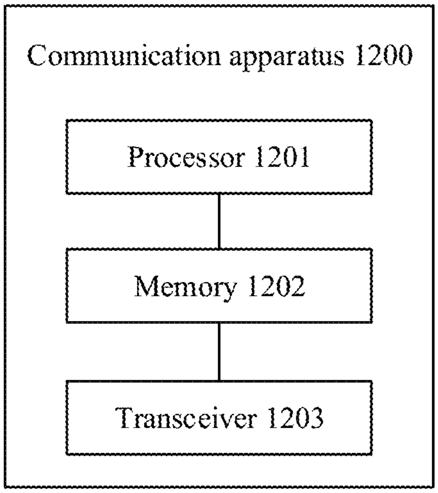
FIG. 12 is a schematic block diagram of another communication apparatus according to this application.

The following describes a communication apparatus provided in this application with reference to FIG. 11 and FIG. 12.

FIG. 11 is a schematic block diagram of a communication apparatus 1100 according to this application. The communication apparatus may be a first terminal device, or may be a component (for example, a chip or a circuit) that can be used in the first terminal device. As shown in FIG. 11, the communication apparatus 1100 may include a processing unit 1101 and a transceiver unit 1102.

The processing unit 1101 is configured to determine a first communication resource in an unlicensed spectrum, where the first communication resource is used to send a synchronization sidelink synchronization signal block S-SSB.

The processing unit may be further configured to determine a physical sidelink broadcast channel payload PSBCH payload in the S-SSB. The PSBCH payload may include at least one of the following parameters: a sending period of the S-SSB, first duration of the S-SSB, and a first device mode. The first device mode includes a load-based equipment mode or a frame-based equipment mode.

The transceiver unit 1102 is configured to send the S-SSB on the first communication resource, and may be further configured to send first information to a third terminal device, where the first information includes sidelink control information and/or sidelink data information.

It should be understood that the third terminal device may be a terminal device including the second terminal device, or may be a terminal device other than the second terminal device and the first terminal device. This is not limited in this application.

For specific functions and beneficial effects of the processing unit 1101 and the transceiver unit 1102, refer to the content on the foregoing method side. Details are not described herein again.

In a possible embodiment, a communication apparatus is further provided. The communication apparatus may be a first terminal device, or may be a component (for example, a chip or a circuit) used in the first terminal device. The communication apparatus may include a transceiver and a processor, and optionally, may further include a memory. The transceiver may be configured to implement corresponding functions and operations corresponding to the sending unit and the processing unit, and the processor may be configured to implement corresponding functions and operations of the processing unit. The memory may be configured to store executable instructions or application program code, and the processor controls execution of the executable instructions or the application program code, to implement the communication method provided in the foregoing embodiments of this application; and/or the memory may be configured to temporarily store some data, instruction information, and the like. The memory may be independent of the processor. In this case, the memory may be connected to the processor through a communication line. In another possible design, the memory may alternatively be integrated with the processor. This is not limited in this embodiment of this application.

It should be understood that the communication apparatus in the embodiment of this application in FIG. 11 may alternatively be a second terminal device, or may be a component (for example, a chip or a circuit) that can be used in the second terminal device. As shown in FIG. 11, the communication apparatus 1100 may include a processing unit 1101 and a transceiver unit 1102.

The transceiver unit 1102 is configured to receive the S-SSB, may be further configured to send the S-SSB to a fourth terminal device, and may be further configured to receive the first information.

The processing unit 1101 may be further configured to determine a communication resource that is in unlicensed frequency domain and that is used to send the S-SSB, and may be further configured to synchronize with the first terminal device.

For specific functions and beneficial effects of the processing unit 1101 and the transceiver unit 1102, refer to the content on the foregoing method side. Details are not described herein again.

It should be understood that the fourth terminal device may be a terminal device including the first terminal device, or may be a terminal device other than the first terminal device. This is not limited in this application.

In a possible embodiment, a communication apparatus is further provided. The communication apparatus may be a second terminal device, or may be a component (for example, a chip or a circuit) used in the second terminal device. The transmission apparatus may include a transceiver and a processor, and optionally, may further include a memory. The transceiver may be configured to implement corresponding functions and operations corresponding to the sending unit and the processing unit, and the processor may be configured to implement corresponding functions and operations of the processing unit. The memory may be configured to store executable instructions or application program code, and the processor controls execution of the executable instructions or the application program code, to implement the communication method provided in the foregoing embodiments of this application; and/or the memory may be configured to temporarily store some data, instruction information, and the like. The memory may be independent of the processor. In this case, the memory may be connected to the processor through a communication line. In another possible design, the memory may alternatively be integrated with the processor. This is not limited in this embodiment of this application.

FIG. 12 is a block diagram of a structure of a communication apparatus according to this application. The communication apparatus may be a first terminal device. As shown in FIG. 12, the first terminal device includes a processor 1201, a radio frequency circuit, an antenna, and an input/output apparatus. The processor 1201 may be configured to process a communication protocol and communication data, control the terminal device, execute a software program, process data of the software program, and the like. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may not have input/output apparatuses. Optionally, the terminal device may further include a memory 1202, and the memory 1202 is mainly configured to store a software program and data.

When data needs to be sent, the processor 1201 performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have receiving and sending functions may be considered as a transceiver 1203 of the terminal device, and the processor that has a processing function may be considered as a processing unit of the terminal device. The transceiver may also be referred to as a transceiver unit, a transceiver machine, a transceiver apparatus, or the like. The processing unit may also be referred to as a processor, a processing board, a processing module, a processing apparatus, or the like. Optionally, a component that is in the transceiver 1203 and that is configured to implement a receiving function may be considered as a receiving unit, and a component that is in the transceiver 1203 and that is configured to implement a sending function may be considered as a sending unit. In other words, the transceiver 1203 includes a receiving unit and a sending unit. The receiving unit sometimes may also be referred to as a receiver machine, a receiver, a receive circuit, or the like. The sending unit sometimes may also be referred to as a transmitter machine, a transmitter, a transmit circuit, or the like.

The processor 1201, the memory 1202, and the transceiver 1203 communicate with each other through an internal connection path, to transfer a control and/or data signal.

Optionally, in some embodiments, the memory 1202 may store instructions used to perform the method performed by the first terminal device in the methods shown in FIG. 3 and FIG. 8 to FIG. 10. The processor 1201 may execute the instructions stored in the memory 1202 and complete, in combination with other hardware (for example, the transceiver 1203), the steps performed by the first terminal device in the methods shown in FIG. 3 and FIG. 8 to FIG. 10. For a specific working process and beneficial effects, refer to the descriptions in the embodiments shown in FIG. 3 and FIG. 8 to FIG. 10.

The method disclosed in embodiments of this application may be applied to the processor 1201, or may be implemented by the processor 1201. The processor 1201 may be an integrated circuit chip and has a signal processing capability. In an implementation process, each step in the foregoing methods may be performed by using a hardware integrated logical circuit in the processor 1201 or an instruction in a form of software.

It should be understood that the communication apparatus shown in FIG. 12 may be a second terminal device. As shown in FIG. 12, the second terminal device includes a processor 1201, a radio frequency circuit, an antenna, and an input/output apparatus. The processor 1201 may be configured to process a communication protocol and communication data, control the second terminal device, execute a software program, process data of the software program, and the like. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of second terminal devices may have no input/output apparatus. Optionally, the second terminal device may further include a memory 1202, and the memory 1202 is mainly configured to store a software program and data.

When data needs to be sent, the processor 1201 performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the second terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual second terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have receiving and sending functions may be considered as a transceiver 1203 of the second terminal device, and the processor that has a processing function may be considered as a processing unit of the second terminal device. The transceiver may also be referred to as a transceiver unit, a transceiver machine, a transceiver apparatus, or the like. The processing unit may also be referred to as a processor, a processing board, a processing module, a processing apparatus, or the like. Optionally, a component that is in the transceiver 1203 and that is configured to implement a receiving function may be considered as a receiving unit, and a component that is in the transceiver 1203 and that is configured to implement a sending function may be considered as a sending unit. In other words, the transceiver 1203 includes a receiving unit and a sending unit. The receiving unit sometimes may also be referred to as a receiver machine, a receiver, a receive circuit, or the like. The sending unit sometimes may also be referred to as a transmitter machine, a transmitter, a transmit circuit, or the like.

The processor 1201, the memory 1202, and the transceiver 1203 communicate with each other through an internal connection path, to transfer a control and/or data signal.

The method disclosed in embodiments of this application may be applied to the processor 1201, or may be implemented by the processor 1201. The processor 1201 may be an integrated circuit chip and has a signal processing capability. In an implementation process, each step in the foregoing methods may be performed by using a hardware integrated logical circuit in the processor 1201 or an instruction in a form of software.

The foregoing processor in embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the aft, such as a random access memory (RAM), a flash memory, a read-only memory (ROM), a programmable read-only memory, an electrically erasable programmable memory, or a register. The storage medium is located in the memory, and a processor reads instructions in the memory and completes the steps in the foregoing methods in combination with hardware of the processor.

Optionally, in some embodiments, the memory 1202 may store instructions used to perform the method performed by the second terminal device in the methods shown in FIG. 3 and FIG. 8 to FIG. 10. The processor 1201 may execute the instructions stored in the memory 1202 and complete, in combination with other hardware (for example, the transceiver 1203), the steps performed by the second terminal device in the methods shown in FIG. 3 and FIG. 8 to FIG. 10. For a specific working process and beneficial effects, refer to the descriptions in the embodiments shown in FIG. 3 and FIG. 8 to FIG. 10.

An embodiment of this application further provides a chip. The chip includes a transceiver unit and a processing unit. The transceiver unit may be an input/output circuit or a communication interface. The processing unit is a processor, a microprocessor, or an integrated circuit integrated on the chip. The chip may perform the method on the first terminal device side and the method on the second terminal device side in the foregoing method embodiment.

An embodiment of this application further provides a computer-readable storage medium. The computer-readable storage medium stores instructions. When the instructions are executed, the method on the first terminal device side and the method on the second terminal device side in the foregoing method embodiments are performed.

An embodiment of this application further provides a computer program product including instructions. When the instructions are executed, the method on the first terminal device side and the method on the second terminal device side in the foregoing method embodiments are performed.

An embodiment of this application further provides a communication system, including a first terminal device and a second terminal device, which are respectively configured to perform the method on the first terminal device side and the method on the second terminal device side in the foregoing method embodiments.

In the embodiments of this application, the terminal device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by a terminal device or a functional module that is in a terminal device and that can invoke and execute the program.

A person of ordinary skill in the art may be aware that, in combination with the examples described in embodiments disclosed in this specification, units and algorithm steps may be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of terminal device units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a terminal device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

determining, by a first terminal device, a first communication resource in an unlicensed spectrum, wherein the first communication resource is used to send a sidelink synchronization signal block (S-SSB), and the S-SSB is used for synchronization between a second terminal device and the first terminal device; and sending, by the first terminal device, the S-SSB to the second terminal device on the first communication resource, wherein a frequency domain resource of the first communication resource is N third resource groups in a second bandwidth part (BWP), each third resource group of the N third resource groups comprises M consecutive RBs, N is greater than or equal to 2, N is a quantity of S-SSBs sent in the second BWP, M indicates a quantity of resource blocks (RBs) occupied for sending one S-SSB; the second BWP comprises Y consecutive RBs;

a product of N and M is less than or equal to Y, and N, M, and Y are all positive integers.

2. The method according to claim 1, wherein a frequency domain resource of the first communication resource is a first resource group in a first bandwidth part (BWP);

the first resource group comprises L resource blocks (RBs);

the first resource group is a part of K consecutive RBs comprised in the first BWP;

L is less than or equal to K;

both L and K are positive integers:

and the first BWP is configured or preconfigured by a network device.

3. The method according to claim 2, wherein:

the L RBs comprised in the first resource group are consecutive;

a time domain resource of the first communication resource is a first time domain resource; and the method further comprises sending first information to a third terminal device on the first time domain resource and a second resource group, wherein the first information comprises sidelink control information or sidelink data information, and the second resource group belongs to an RB other than the first resource group in the K consecutive RBs comprised in the first BWP.

4. The method according to claim 3, wherein:

the second resource group belongs to a first interlaced resource block group;

the first interlaced resource block group comprises at least one interlaced resource block;

an index value difference between adjacent RBs in the interlaced resource block is equal to M, M is 5 or 10; and the first interlaced resource block group is a part of the first BWP.

5. The method according to claim 1, wherein:

a same quantity of spaced RBs are disposed between adjacent third resource groups in the N third resource groups; and the quantity of spaced RBs is configured by a network device, or preconfigured.

6. The method according to claim 1, wherein:

a time domain resource of the first communication resource corresponds to a first moment; and the method further comprises determining a second communication resource based on the first moment and a first duration.

7. The method according to claim 6, wherein a value of the first duration includes {1, 2, 4, 5, 10, 20, 40, 80, 160, 320}, and the first duration is in a unit of a slot.

8. A method, comprising:

receiving, by a second terminal device, on a first communication resource in an unlicensed spectrum, a sidelink synchronization signal block (S-SSB) from a first terminal device, wherein the S-SSB is used for synchronization between the second terminal device and the first terminal device; and synchronizing, by the second terminal device, with the first terminal device based on the S-SSB, wherein:

a frequency domain resource of the first communication resource is N third resource groups in a second bandwidth part (BWP), each third resource group of the N third resource groups comprises M consecutive resource blocks (RBs), N is greater than or equal to 2, N is a quantity of S-SSBs sent in the second BWP, M indicates a quantity of RBs occupied for sending one S-SSB, the second BWP comprises Y consecutive RBs, a product of N and M is less than or equal to Y, and N, M, and Y are all positive integers.

9. The method according to claim 8, wherein:

a same quantity of spaced RBs are disposed between adjacent third resource groups in the N third resource groups; and the quantity of spaced RBs is configured by a network device, or preconfigured.

10. The method according to claim 8, wherein:

a time domain resource of the first communication resource corresponds to a first moment; and the method further comprises:

when the second terminal device receives no S-SSB within a first duration after the first moment, receiving, by the second terminal device, a second S-SSB within a second duration after a second moment, wherein a difference between the second moment and the first moment is the first duration.

11. An apparatus, comprising:

at least one processor; and one or more memories coupled to the at least one processor and storing programming instructions for execution by the at least one processor that enable the at least one processor to perform operations comprising:

determining a first communication resource in an unlicensed spectrum, wherein the first communication resource is used to send a sidelink synchronization signal block, (S-SSB), and the S-SSB is used for synchronization between a second terminal device and the apparatus; and sending the S-SSB to the second terminal device on the first communication resource, wherein:

a frequency domain resource of the first communication resource is N third resource groups in a second bandwidth part (BWP), each third resource group of the N third resource groups comprises M consecutive resource blocks (RBs), N is greater than or equal to 2, N is a quantity of S-SSBs sent in the second BWP, M indicates a quantity of RBs occupied for sending one S-SSB, the second BWP comprises Y consecutive RBs, a product of N and M is less than or equal to Y, and N, M, and Y are all positive integers.

12. The apparatus according to claim 11, wherein a frequency domain resource of the first communication resource is a first resource group in a first bandwidth part (BWP);

the first resource group comprises L resource blocks (RBs);

the first resource group is a part of K consecutive RBs comprised in the first BWP;

L is less than or equal to K;

both L and K are positive integers; and the first BWP is configured or preconfigured by a network device.

13. The apparatus according to claim 12, wherein:

the L RBs comprised in the first resource group are consecutive;

a time domain resource of the first communication resource is a first time domain resource; and the programming instructions further enable the at least one processor to perform operations comprising:

sending first information to a third terminal device on the first time domain resource and a second resource group, wherein the first information comprises sidelink control information or sidelink data information, and the second resource group belongs to an RB other than the first resource group in the K consecutive RBs comprised in the first BWP.

14. The apparatus according to claim 13, wherein:

the second resource group belongs to a first interlaced resource block group;

the first interlaced resource block group comprises at least one interlaced resource block;

an index value difference between adjacent RBs in the interlaced resource block is equal to M, M is 5 or 10; and the first interlaced resource block group is a part of the first BWP.

15. The apparatus according to claim 11, wherein a same quantity of spaced RBs are disposed between adjacent third resource groups in the N third resource groups, wherein the quantity of spaced RBs is configured by a network device, or preconfigured.

16. The apparatus according to claim 11, wherein:

a time domain resource of the first communication resource corresponds to a first moment; and the programming instructions further enable the at least one processor to perform operations comprising:

determining a second communication resource based on the first moment and a first duration.

17. The apparatus according to claim 16, wherein a value of the first duration includes {1, 2, 4, 5, 10, 20, 40, 80, 160, 320}, and the first duration is in a unit of a slot.

18. An apparatus, comprising:

at least one processor; and one or more memories coupled to the at least one processor and storing programming instructions for execution by the at least one processor that enable the at least one processor to perform operations comprising:

receiving on a first communication resource in an unlicensed spectrum, a sidelink synchronization signal block (S-SSB) from a first terminal device, wherein the S-SSB is used for synchronization between a second terminal device and the first terminal device; and synchronizing with the first terminal device based on the S-SSB, wherein:

a frequency domain resource of the first communication resource is N third resource groups in a second bandwidth part (BWP), each third resource group of the N third resource groups comprises M consecutive resource blocks (RBs), N is greater than or equal to 2, N is a quantity of S-SSBs sent in the second BWP, M indicates a quantity of RBs occupied for sending one S-SSB, the second BWP comprises Y consecutive RBs, a product of N and M is less than or equal to Y, and N, M, and Y are all positive integers.

19. The apparatus according to claim 18, wherein:

a same quantity of spaced RBs are disposed between adjacent third resource groups in the N third resource groups, wherein the quantity of spaced RBs is configured by a network device, or preconfigured.

20. The apparatus according to claim 18, wherein:

a time domain resource of the first communication resource corresponds to a first moment; and the programming instructions further enable the at least one processor to perform operations comprising:

when no S-SSB is received within a first duration after the first moment, receiving a second S-SSB within a second duration after a second moment, wherein a difference between the second moment and the first moment is the first duration.

* * * * *